US007218013B2

(12) United States Patent
Platt

(10) Patent No.: US 7,218,013 B2
(45) Date of Patent: May 15, 2007

(54) WIND POWERED GENERATOR

(76) Inventor: Steve Anderson Platt, 15431 Howard, Spring Lake, MI (US) 49456

(*) Notice: Subject to any disclaimer, the term of this patent is extended or adjusted under 35 U.S.C. 154(b) by 863 days.

(21) Appl. No.: 09/981,231

(22) Filed: Oct. 17, 2001

(65) Prior Publication Data
US 2003/0071468 A1    Apr. 17, 2003

(51) Int. Cl.
F03D 11/04    (2006.01)
(52) U.S. Cl. ........................................ 290/55
(58) Field of Classification Search ............... 240/44, 240/55; 416/142, 48, 11, 9; 52/40
See application file for complete search history.

(56) References Cited

U.S. PATENT DOCUMENTS

| 4,169 | A | | 9/1845 | Brown ........................ 209/295 |
|---|---|---|---|---|
| 263,113 | A | | 8/1882 | Chamberlain et al. ......... 416/41 |
| 666,946 | A | | 1/1901 | Wallace ........................ 416/136 |
| 1,183,219 | A | | 5/1916 | Manikowske ................. 290/44 |
| 1,255,998 | A | | 2/1918 | Fahle ......................... 290/40 F |
| 1,334,485 | A | | 3/1920 | Clipfell et al. ................. 290/55 |
| 1,978,143 | A | | 10/1934 | Reimers ........................ 290/55 |
| 2,029,503 | A | | 2/1936 | Peterson ........................ 416/89 |
| 2,052,454 | A | | 8/1936 | Ellwood, II et al. ........... 416/89 |
| 2,080,955 | A | | 5/1937 | Watkins ........................ 290/44 |
| 2,224,052 | A | | 12/1940 | Irwin .......................... 290/55 |
| 2,511,023 | A | * | 6/1950 | Thomas ......................... 52/40 |
| 2,688,285 | A | | 9/1954 | Stockett, Jr. et al. .......... 416/37 |
| 3,096,828 | A | | 7/1963 | Hollingsworth .............. 416/37 |
| 3,856,639 | A | * | 12/1974 | Rohn et al. .................... 362/35 |
| 4,006,925 | A | | 2/1977 | Scherer ........................ 290/55 |
| 4,213,057 | A | | 7/1980 | Are ............................. 290/44 |
| 4,231,200 | A | * | 11/1980 | Henderson ..................... 52/111 |
| 4,282,944 | A | | 8/1981 | Trumpy ....................... 180/2.2 |
| 4,311,434 | A | * | 1/1982 | Abe ........................... 416/142 |
| 4,323,331 | A | * | 4/1982 | Schachle et al. ............... 416/9 |

(Continued)

FOREIGN PATENT DOCUMENTS

CH    636411    7/1980

(Continued)

OTHER PUBLICATIONS

"Development of a 4 KW Wind Turbine Generator" from conference entitled "Energy to the 21$^{st}$ Century;" Bottrell et al.; 1980; 4 pages.

(Continued)

*Primary Examiner*—Joseph Waks
(74) *Attorney, Agent, or Firm*—Price, Heneveld, Cooper, DeWitt & Litton, LLP

(57) ABSTRACT

A wind powered electrical generation assembly having a portable wind powered generator tower for supporting a wind powered generator allowing the wind powered generator to be raised, lowered, and removed from the tower. The wind powered electrical generation assembly also includes a vertical elevator on the tower configured to vertically lift the wind powered generator with a carriage to position the wind powered generator at a top of the tower. The wind powered electrical generation assembly further includes a wind powered generator is having at least spars and at least six airfoils with mating cams to rotate the airfoils relative to the spars as the airfoils move along the spars towards an end of the spars as wind passes the airfoils.

64 Claims, 13 Drawing Sheets

U.S. PATENT DOCUMENTS

| | | | | |
|---|---|---|---|---|
| 4,333,018 | A | | 6/1982 | Bottrell ........................ 290/55 |
| 4,366,386 | A | | 12/1982 | Hanson ........................ 290/44 |
| 4,366,387 | A | | 12/1982 | Carter, Jr. et al. ............ 290/55 |
| 4,403,916 | A | * | 9/1983 | Skelskey ..................... 416/14 |
| 4,408,958 | A | * | 10/1983 | Schacle ....................... 416/237 |
| 4,423,333 | A | * | 12/1983 | Rossman ..................... 290/44 |
| 4,495,423 | A | | 1/1985 | Rogers ........................ 290/44 |
| 4,585,950 | A | * | 4/1986 | Lund ........................... 290/44 |
| 4,641,039 | A | | 2/1987 | Carre .......................... 290/44 |
| 4,678,923 | A | | 7/1987 | Trepanier .................... 290/55 |
| 5,178,518 | A | * | 1/1993 | Carter, Sr. .................... 416/11 |
| 5,182,458 | A | | 1/1993 | McConachy ................. 290/55 |
| 5,213,470 | A | * | 5/1993 | Lundquist .................... 416/9 |
| 5,244,346 | A | * | 9/1993 | Fergusson ................... 416/142 |
| 5,315,159 | A | * | 5/1994 | Gribnau ....................... 290/55 |
| 5,490,364 | A | * | 2/1996 | Desai et al. .................. 52/637 |
| 5,584,655 | A | * | 12/1996 | Deering ....................... 416/31 |
| 5,599,168 | A | | 2/1997 | Lund ........................... 416/136 |
| 5,616,963 | A | * | 4/1997 | Kikuchi ....................... 73/493 |
| 6,239,507 | B1 | * | 5/2001 | Douthit ........................ 290/55 |
| 6,278,198 | B1 | * | 8/2001 | Willis et al. .................. 290/55 |
| 6,357,549 | B1 | * | 3/2002 | Brennan et al. ............. 182/133 |
| 6,408,575 | B1 | * | 6/2002 | Yoshida et al. ................ 52/40 |
| 6,467,233 | B1 | * | 10/2002 | Maliszewski et al. ...... 52/720.1 |
| 6,504,260 | B1 | * | 1/2003 | Debleser ...................... 290/44 |

FOREIGN PATENT DOCUMENTS

| | | |
|---|---|---|
| FR | 634589 | 2/1928 |
| FR | 2624211 | 6/1989 |

OTHER PUBLICATIONS

"Wind powers contra-rotating generator;" J.F. Lowe; Feb. 18, 1974; 2 pages.

"Something in the Wind? ERDA Thinks So;" Theodore W. Black; May 20, 1976; 7 pages.

"Computerized windmill delivers 200 kW to utility grid;" Engineering News; May 7, 1979; 3 pages.

\* cited by examiner

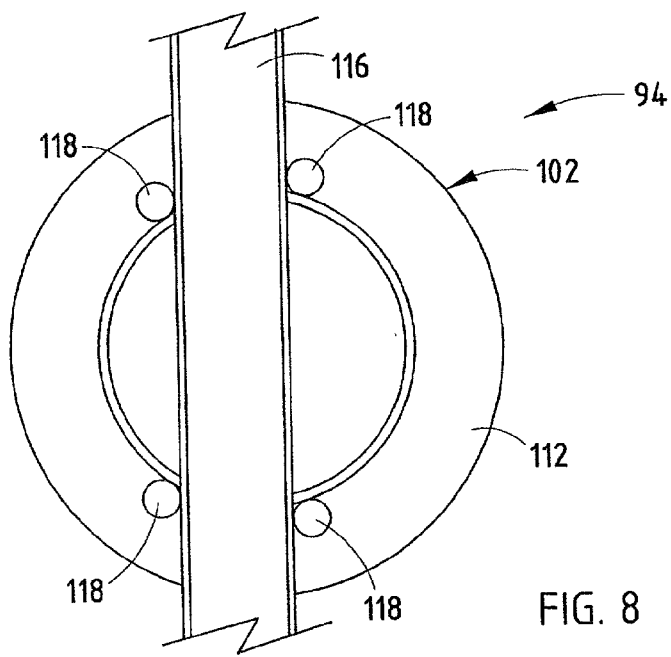
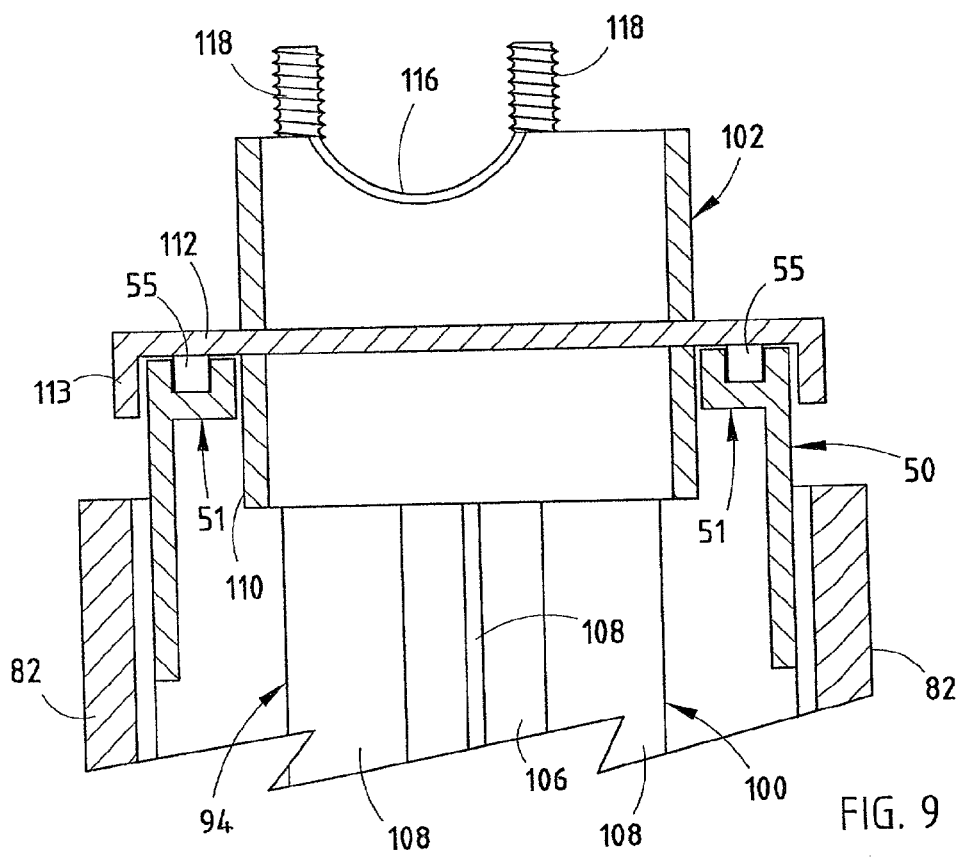

WIND POWERED GENERATOR

BACKGROUND OF THE INVENTION

This invention relates generally to wind turbines, and more particularly to wind powered electrical generation assembly.

Shortages and increased cost of fossil fuels have stimulated renewed interest in the use of wind power to generate electricity. Wind powered generators are used to harness the power of the wind and to translate the mechanical energy of the wind into electrical energy with a generator. The energy from the generator can be used to power any number of electrical devices, potentially including all of the power requirements of a home.

Heretofore, wind powered generators have included airfoils designed specifically for wind turbines. Wind blowing past a turbine does not push the blades, but rather the air passing over the blades' upper surface travels farther than air crossing the underside, thus resulting in a pressure difference that creates lift. As lift drives the blades forward, they turn a drive shaft connected to a generator. However, wind powered generators typically have been too large, too expensive or too loud to allow a typical homeowner to use the wind powered generator to power their homes. Furthermore, the wind powered generators have been too hard for a typical home owner to transport and install easily at their homes.

Accordingly, a wind powered electrical generation system solving the aforementioned disadvantages and having the aforementioned advantages is desired.

SUMMARY OF THE INVENTION

The wind powered electrical generation assembly of the present invention can easily be used and installed to produce energy by a home owner. In a first aspect of the present invention, a portable wind powered generator tower for supporting a wind powered generator is provided that includes a lower tower section and an upper tower section, and an elevator configured to be connected to a wind powered generator to raise and lower the wind powered generator from the lower tower section to the upper tower section, thereby allowing the wind powered generator to be raised, lowered, and removed from the tower.

In a second aspect of the present invention, a wind powered generator support assembly for supporting a wind powered generator is provided that includes a tower and a vertical elevator on the tower configured to vertically lift the wind powered generator with a carriage to position the wind powered generator at a top of the tower.

In a third aspect of the present invention, a wind powered electrical generation system is provided that includes a tower including a vertical elevator and a carriage, and a wind powered generator configured to be connected to the carriage, wherein the wind powered generator can be placed within the carriage after the tower has been erected and lifted vertically with the carriage to position the wind powered generator at a top of the tower.

In a fourth aspect of the present invention, a wind powered generator is provided that includes a housing, a rod configured to rotate within the housing, at least two spars connected to the rod and an airfoil connected to each of the spars. Each spar includes a cam member and each airfoil includes a cam surface configured to engage the cam member on the spar to thereby rotate the airfoils relative to the spars as the airfoils move along the spars towards an end of the spars.

In a fifth aspect of the present invention, a wind powered generator is provided that includes a housing, a rod configured to rotate within the housing, at least six spars connected to the rod, an airfoil connected to each of the spars and a generator located upwind of the spars and interconnected to the rod, wherein the spars and the rod will rotate as wind passes the airfoils to thereby power the generator.

In a sixth aspect of the present invention, a wind powered electrical generation system is provided that includes a tower having an elevator with a carriage, a first member rotatably connected to the carriage, a second member connected to the first member, and a hub assembly connected to the second member. The hub assembly includes a plurality of spars and an airfoil is connected to each spar. A generator is also connected to the second member. The spars and the second member will rotate as wind passes the airfoils, thereby powering the generator.

In a seventh aspect of the present invention, a portable wind powered generation system is provided that includes a tower having an upper tower section and a lower tower section, with the upper tower section and the lower tower section being removably connected. The portable wind powered generation system also includes a wind powered generator and an elevator connected to the tower, with the elevator being able to move between the lower tower section and the upper tower section of the tower. The wind powered generator is configured to be connected to the elevator to raise the wind powered generator from the lower tower section to the upper tower section. Furthermore, the wind powered generator can be unconnected from the elevator and the upper tower section can be unconnected from the lower tower section, thereby allowing the portable wind powered generator assembly to be easily transported and erected.

These and other features, advantages and objects of the present invention will be further understood and appreciated by those skilled in the art by reference to the following specification, claims and appended drawings.

BRIEF DESCRIPTION OF THE DRAWINGS

FIG. 8 is a top view of the vertical member of the wind powered generator of the present invention.

FIG. 9 is a cross sectional view of the vertical member of the wind powered generator within the carriage of the portable tower of the present invention.

DETAILED DESCRIPTION OF THE
PREFERRED EMBODIMENT

Figure 1:
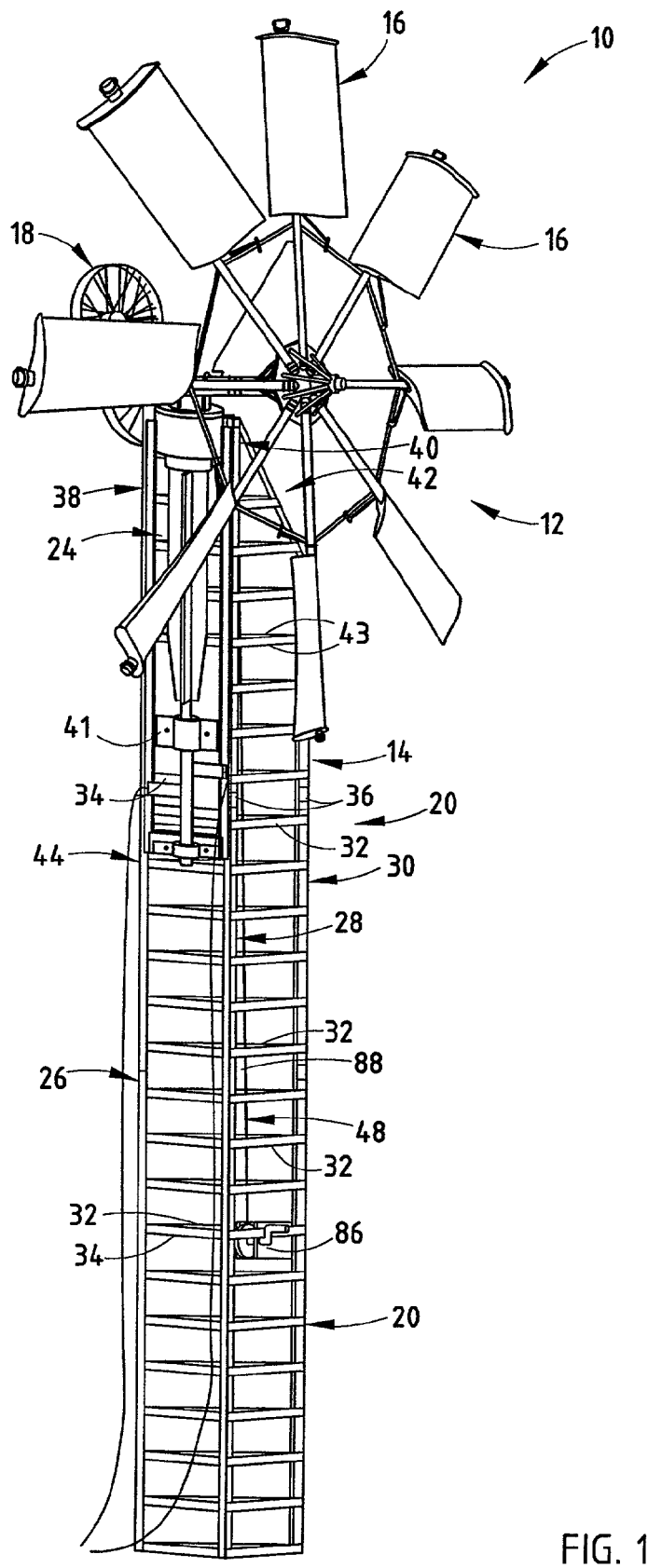
FIG. 1 is front perspective view of a wind powered electrical generation system of the present invention.

For purposes of description herein, the terms "upper," "lower," "right," "left," "rear," "front," "vertical," "horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
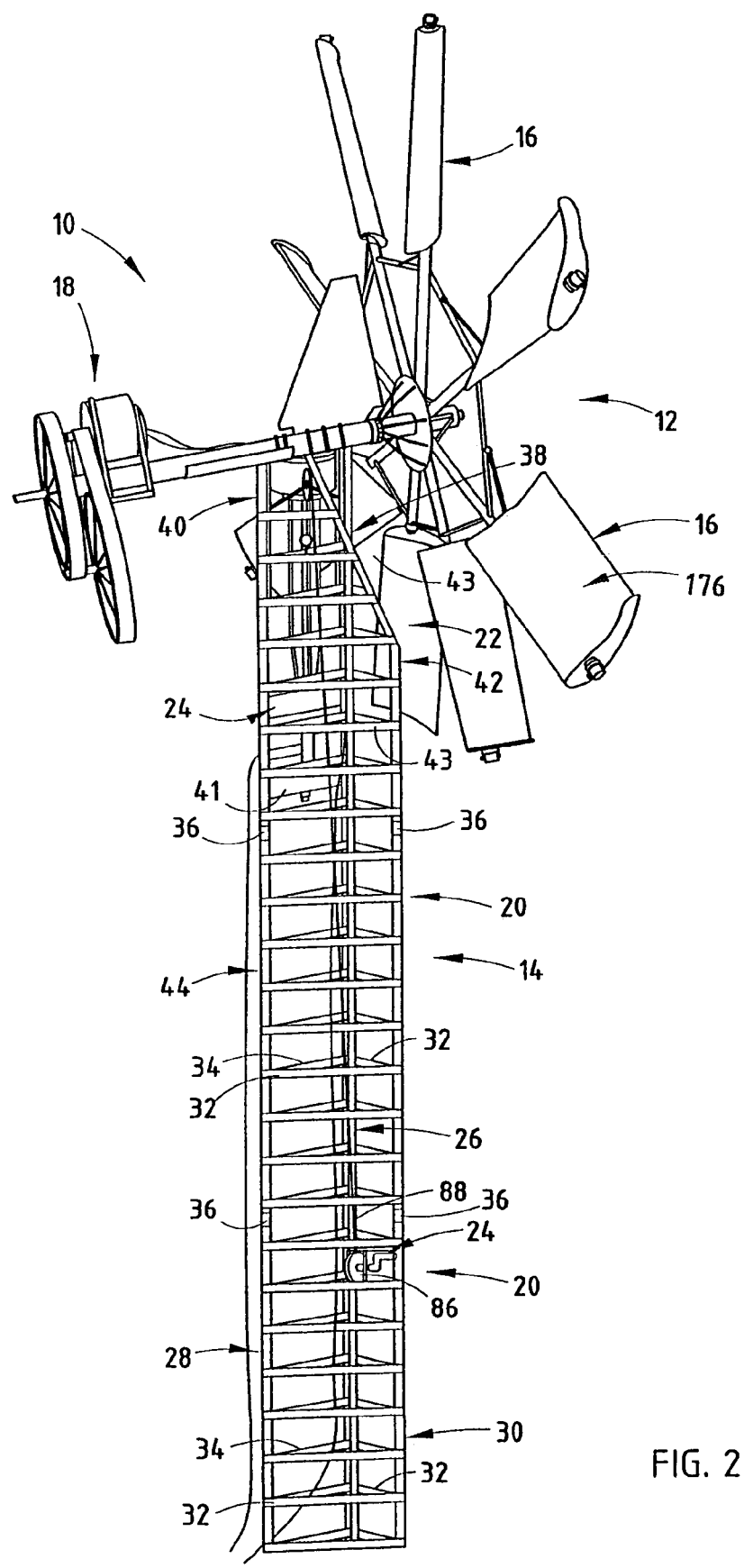
FIG. 2 is rear perspective view of the wind powered electrical generation system of the present invention.
Figure 3:
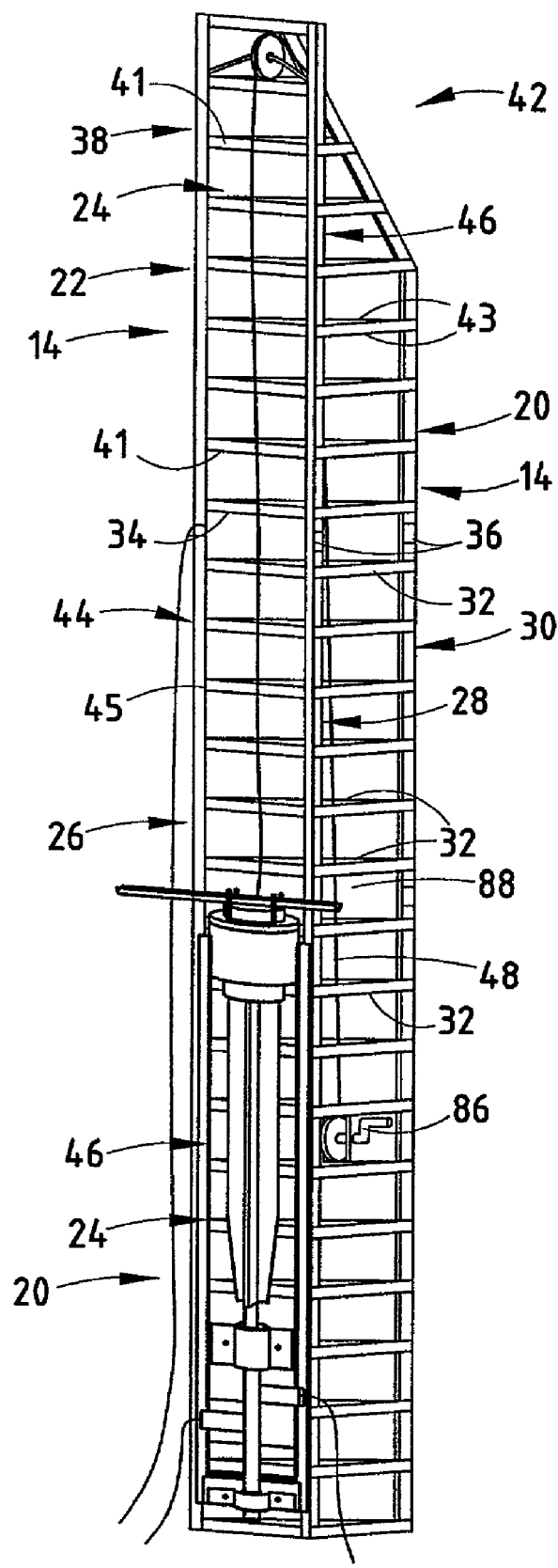
FIG. 3 is front perspective view of a portable tower of the present invention.

The reference number 10 (FIGS. 1 and 2) generally designates a wind powered electrical generation system embodying the present invention. In the illustrated example, the wind powered electrical generation system 10 includes a wind powered generator 12 and a portable tower 14 for supporting the wind powered generator 12 above the ground. The wind powered generator 12 includes a plurality of airfoils 16 adapted to rotate as wind blows by the airfoils 16 to power a electrical generation assembly 18. The electrical generation assembly 18 converts the mechanical energy from the rotation of the airfoils 16 into electrical power and transmits the electrical power through wiring to a remote source (not shown).

In the illustrated example, the portable tower 14 (FIGS. 1–4) supports the wind powered generator 12 above the ground to allow the airfoils 16 of the wind powered generator 12 to contact a sufficient amount of wind to provide steady rotation of the airfoils 16. The portable tower 14 includes two lower tower sections 20, an upper tower section 22 and an elevator 24 for raising and lowering the wind powered generator 12 between a bottom of the tower 14 and a top of the tower 14. The lower tower sections 20 each include a left L-shaped column 26, a right L-shaped column 28 and a rear L-shaped column 30. In a preferred embodiment, each of the legs of the L-shaped columns 26, 28 and 30 have a 60° angle therebetween and the L-shaped columns 26, 28 and 30 are positioned to form the corners of an equilateral triangle. The lower tower sections 20 include an outside horizontal brace 32 extending between and connected to an outside face of the left L-shaped column 26 and the rear L-shaped column 30 at one foot intervals for stabilizing the L-shaped columns 26 and 30. Another set of outside horizontal braces 32 extend between and are connected to the outside faces of the right L-shaped column 28 and the rear L-shaped column 30 at one foot intervals for stabilizing the L-shaped columns 28 and 30. The lower tower sections 20 further include an inside horizontal brace 34 extending between a vertical edge of the leg of the left L-shaped column 26 nearest the rear L-shaped column 30 and the vertical edge of the leg of the right L-shaped column 28 nearest the rear L-shaped column 30 at one foot intervals to connect the left L-shaped column 26 to the right L-shaped column 28. The lower tower sections 20 are preferably eight feet in height, although it is contemplated that any height could be employed. Furthermore, although two lower tower sections 20 are shown, one or more lower tower sections 20 can be used, depending on the height of the lower tower section 20 and the desired height of the wind powered generator 12.

The lower portion of the illustrated tower 14 is built by vertically stacking the lower tower sections 20. To begin construction of the tower 14, a lowermost lower tower section 20 is positioned on the ground or other support and then a second lower tower section 20 is positioned above the lowermost lower tower section 20, with the left L-shaped column 26 of the second lower tower section 20 being vertically aligned with the left L-shaped column 26 of the lowermost lower tower section 20, the right L-shaped column 28 of the second lower tower section 20 being vertically aligned with the right L-shaped column 28 of the lowermost lower tower section 20 and the rear L-shaped column 30 of the second lower tower section 20 being vertically aligned with the rear L-shaped column 30 of the lowermost lower tower section 20. Thereafter, vertical braces 36 are fastened to the top of the columns 26, 28 and 30 of the lowermost lower tower section 20 in the bottoms of the columns 26, 28 and 30 of the second lower tower section 20. If more lower tower sections 20 are used, the lower tower sections 20 are stacked and connected with vertical braces 36 as described directly above, building the tower 14 upwards.

In the illustrated example, the upper tower section 22 is configured similar to the lower tower sections 20 and includes a top left L-shaped column 38 and a top right L-shaped column 40 identical to the left L-shaped column 26 and the right L-shaped column 28, respectively, of the lower tower section 20. The upper tower section 22 includes a plurality of top inside horizontal braces 41 extending between the rearmost vertical edges of the top left L-shaped column 38 and the top right L-shaped column 40 identical to the inside horizontal braces 34 extending between the left L-shaped column 26 and the right L-shaped column 28 of the lower tower sections 20. A top rear L-shaped column 42 extends upwardly from the adjacent lower tower section 20 and then converges towards the top inside horizontal brace 41 located between the top edges of the top right L-shaped column 40 and the top left L-shaped column 38. A plurality of top outside horizontal braces 43 extend from the outside faces of both the top left L-shaped column 38 and the top right L-shaped column 40 to the outside faces of the top rear L-shaped column 42, similar to the outside horizontal braces 32 extending from the left L-shaped columns 26 to the rear L-shaped column 30 of the lower tower sections 20. The topmost top inside horizontal brace 41 and the topmost outside horizontal braces 43 form a triangle about half the size of the triangle formed by the columns of the lower tower sections 20. The upper tower section 22 is connected to the adjacent lower tower section 20 using vertical braces 36 as discussed above. Therefore, the vertical braces 36 are fastened to the bottoms of the columns 38, 40 and 42 of the upper tower section 22 and the tops of the columns 26, 28 and 30 of the adjacent lower tower section 20. The upper tower section 22 is eight feet in height, with the top two to four feet of the top rear L-shaped column 42 being slanted towards the top horizontal brace 41 between the top left L-shaped column 38 and the top right L-shaped column 40. It is contemplated, however, that the upper tower section could be more or less than eight feet in height. Once the lower tower sections 20 and the upper tower section 22 are assembled, the elevator 24 is also fully assembled and ready to raise and lower the wind powered generator 12.

Figure 4:
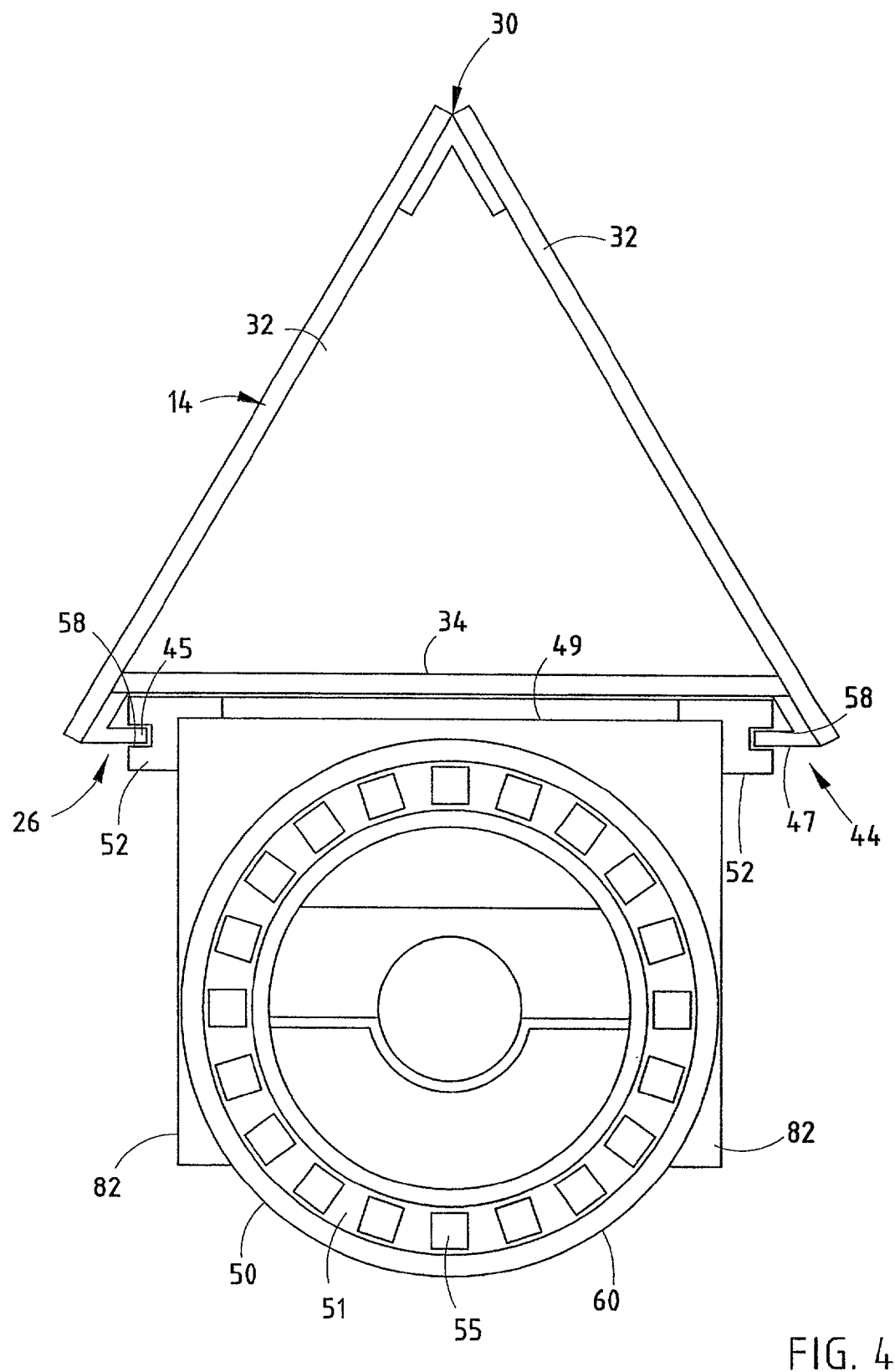
FIG. 4 is a cross sectional view of the portable tower of the present invention taken along the line IV—IV of FIG. 3.
Figure 5:
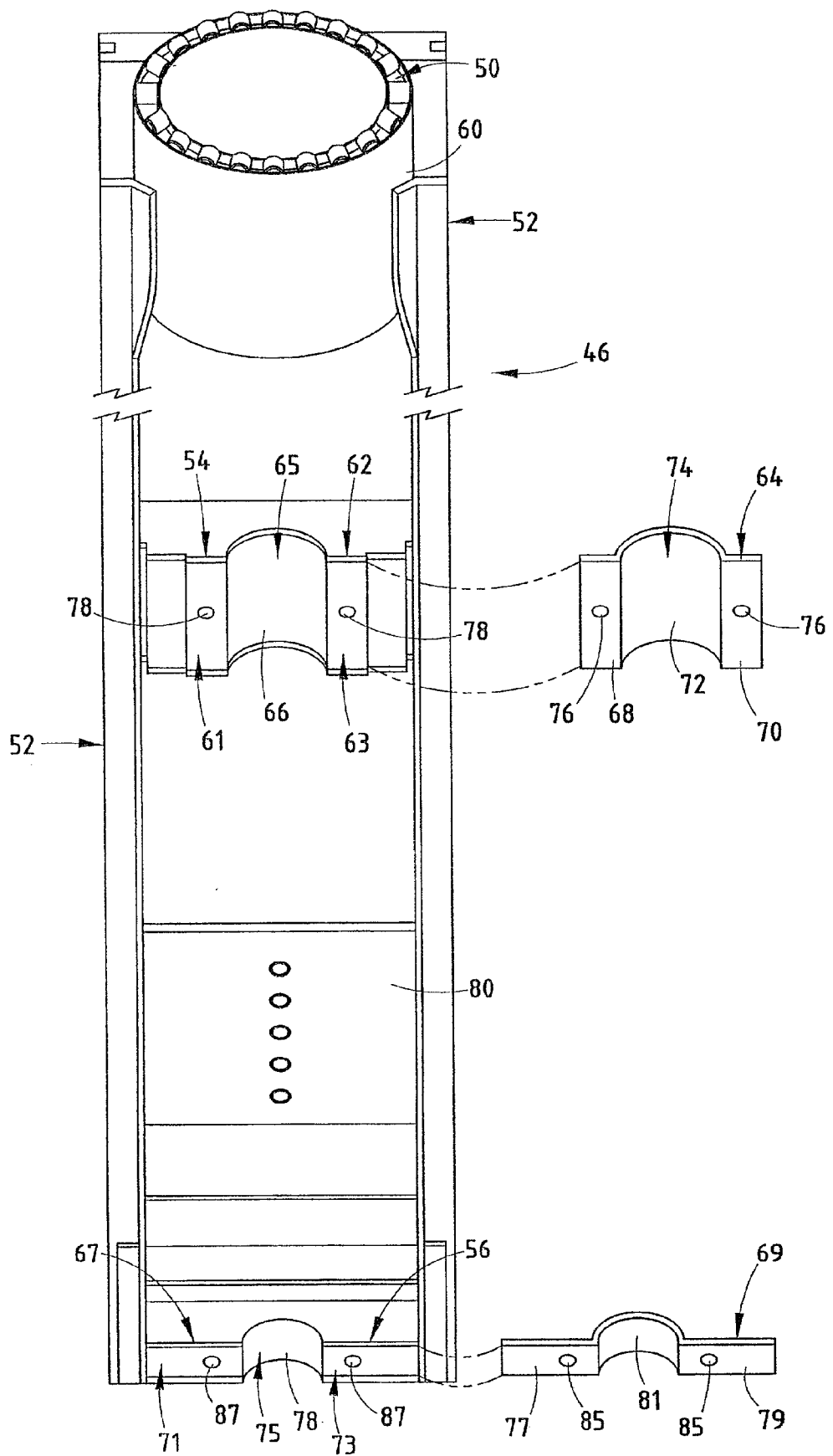
FIG. 5 is a front view of a carriage of the present invention.

The illustrated elevator 24 includes a vertical track 44 and a carriage 46 (FIGS. 4 and 5). The carriage 44 is adapted to move vertically along the vertical track 44 to move the wind powered generator 12 from a top of the portable tower 14 to the bottom of the portable tower 14. The vertical track 44 is comprised of a pair of vertical flanges forming a first side guide 45 and a second side guide 47. The first side guide 45 comprises the forward legs or vertical strip portions of the left L-shaped columns 26 of the lower tower sections 20 and the top left L-shaped column 38 of the upper tower section 22. The second side guide 47 comprises the forward legs or strips of the right L-shaped column 28 of the lower tower sections 20 and the top right L-shaped column 40 of the upper tower section 22. Consequently, when the tower 14 is constructed as described above, the vertical flanges 48 are aligned and the vertical track 44 is formed.

In the illustrated example, the carriage 46 (FIGS. 4, 5 and 9) includes a top pivot ring 50 configured to vertically support the wind powered generator 12, a middle support 54 and a lower support 56 for maintaining the wind powered generator 12 in a proper horizontal position, and a pair of U-shaped tracks 52 connecting the top pivot ring 50, the middle support 54 and the lower support 56. As seen in FIG. 9, the top pivot ring 50 includes an annular support flange 51 extending inward and upward from the inside surface 53 of the top pivot ring 50 adjacent a top of the top pivot ring 50. The annular support flange 51 includes a plurality of roller bearings 55. As explained in more detail below, the wind powered generator 12 is configured to rest on the roller bearings 55 to allow the wind powered generator 12 to rotate relative to the carriage 46 and the portable tower 14. The roller bearings 55 are preferably well greased to allow the wind powered generator 12 to easily rotate. The pair of U-shaped tracks 52 define a groove 58 adapted to accept the vertical flanges 48 of the vertical track 48 of the elevator 24. Therefore, the carriage 46 is allowed to slide vertically along the vertical track 44 by sliding the carriage 46 up and down the tower 14 with the vertical flanges 48 of the vertical track 44 within the groove 58 of the U-shaped tracks 52. A C-shaped housing 49 is connected to the sides and rear surface of the top pivot ring 50. The U-shaped tracks 52 are connected to rear corners of the C-shaped housing 49 and extend downward therefrom such that an axis of the top pivot ring 50 is parallel to the vertical track 44. Additionally, the rear portion of the outside annular surface 60 of the top pivot ring 50 is preferably located between a rear portion of the pair of U-shaped tracks 52 so the top pivot ring 50 and the C-shaped housing 49 will not strike the inside horizontal braces 34 and 41 of the lower tower sections 20 and the upper tower section 22 as the carriage 46 moves up and down the vertical track 48.

The illustrated middle support 54 of the carriage 46 provides stability for the carriage 46 and assists in retaining the wind powered generator 12 within the carriage 46. The middle support 54 includes a first middle support piece 62 and a second middle support piece 64. The first middle support piece 54 is a beam extending between the U-shaped tracks 52 at a location in the middle of the height of the U-shaped tracks 52. The first middle support piece 54 includes a left portion 61 connected to the left side U-shaped track 52, a right portion 63 connected to the right side U-shaped track 52 and a middle portion 65 having a first semi-circular channel 66 therein that faces away from the tower 14. The second middle support piece 64 includes a first side flange 68 and a second side flange 70 with a C-shaped middle flange 72 forming a second semi-circular channel 74. The first side flange 68 and the second side flange 70 include fastener openings 76 adapted to be aligned with fastener openings 78 in the left portion 61 and the right portion 63, respectively, in the first middle support piece 62 for attaching the second middle support piece 64 to the first middle support piece 62 with fasteners (not shown). Once the first middle support piece 62 is connected to the second middle support piece 64, the first semi-circular channel 66 of the first middle support piece 62 and the second semi-circular channel 74 of the second middle support piece 64 will form a ring having an axis co-linear with the top pivot ring 50. As described in more detail below, once the wind powered generator 12 is positioned on the top pivot ring 50 of the carriage 46, the second middle support piece 64 is connected to the first middle support piece 62 to assist in horizontally stabilizing the wind powered generator 12.

In the illustrated example, the lower support 56 provides further stability to the carriage 46 and also assists in retaining the wind powered generator 12 within the carriage 46. The lower support 56 includes a first lower support piece 67 and a second lower support piece 69. The first lower support piece 67 is a beam extending between the U-shaped tracks 52 at a location at the bottom of the U-shaped tracks 52. The first lower support piece 67 includes a left portion 71 connected to the left side U-shaped track 52, a right portion 73 connected to the right side U-shaped track 52 and a middle portion 75 having a first semi-circular channel 78 therein that faces away from the tower 14. The second lower support piece 69 includes a first side flange 77 and a second side flange 79 with a C-shaped middle flange 81 forming a second semi-circular channel 81. The first side flange 77 and the second side flange 79 include fastener openings 85 adapted to be aligned with fastener openings 87 in the left portion 71 and the right portion 73, respectively, in the first lower support piece 67 for attaching the second lower support piece 69 to the first lower support piece 67 with fasteners (not shown). Once the first lower support piece 67 is connected to the second lower support piece 69, the first semi-circular channel 78 of the first lower support piece 67 and the second semi-circular channel 81 of the second lower support piece 69 will form a ring having an axis co-linear with the top pivot ring 50. As described in more detail below, once the wind powered generator 12 is positioned on the top pivot ring 50 of the carriage 46, the second lower support piece 69 is connected to the first lower support piece 67 to assist in horizontally stabilizing the wind powered generator 12. The carriage 46 also includes a strengthening cross plate 80 extending between the U-shaped tracks 52 at a location below the middle support 54 and above the lower support 56. The carriage 46 further includes a pair of L-shaped support flanges 82 connected to a front portion of the outside annular surface 60 of the top pivot ring 50 and extend rearward to a lower portion of the U-shaped tracks 52 to provide structural stability to the carriage 46.

The illustrated tower 14 also includes a carriage raising assembly 48 (FIGS. 1–3) for raising and lowering the carriage 46. The carriage raising assembly 84 includes a winch 86, a cable 88 and a pulley 90. The winch 86 is preferably a windlass connected to the lowermost lower tower section 20 and is accessible by a person standing near the lowermost lower tower section 20 of the tower 14. The pulley 90 is connected to a U-shaped pulley support bar 92 connected to the top left L-shaped column 38 and the top right L-shaped column 40 between the topmost top inside horizontal brace 41 and the second highest top inside horizontal brace 41 of the upper tower section 22. The cable 88 is connected at a first end to the winch 86, extends upward to and wraps around the pulley 90, extends from the pulley 90 towards the carriage 46, and is connected at a second end to the cross plate 80 of the carriage 46. A user of the wind powered electrical generation system 10 can raise and lower the carriage 46 and the wind powered generator 12 by winding the winch 86. The winch 86 therefore includes a locking mechanism for maintaining the carriage 46 in a vertically selected position. It is further contemplated that the carriage 46 can be raised and lowered by other means, including a powered winch.

Figure 6:
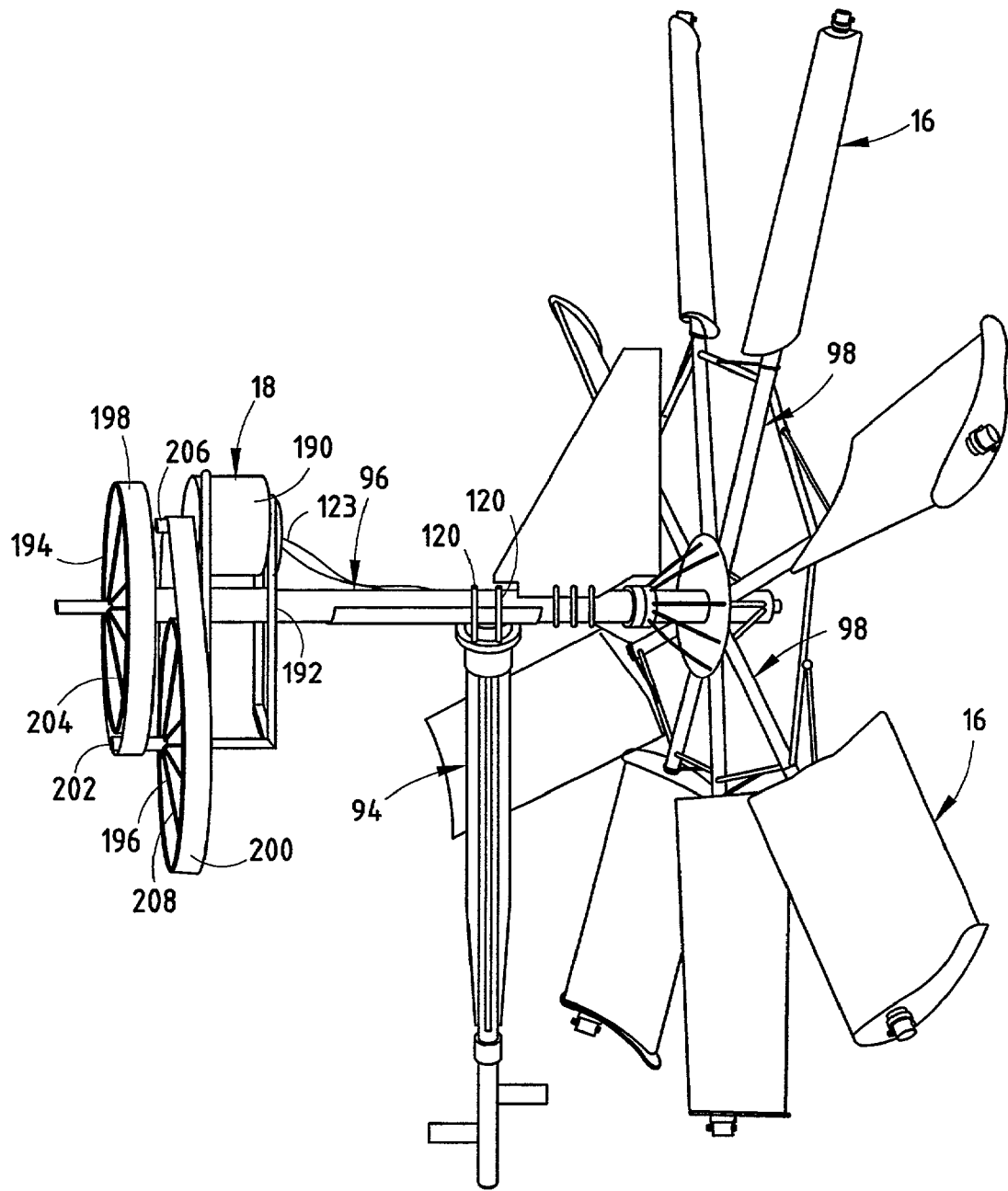
FIG. 6 is a perspective view of a wind powered generator of the present invention.
Figure 7:
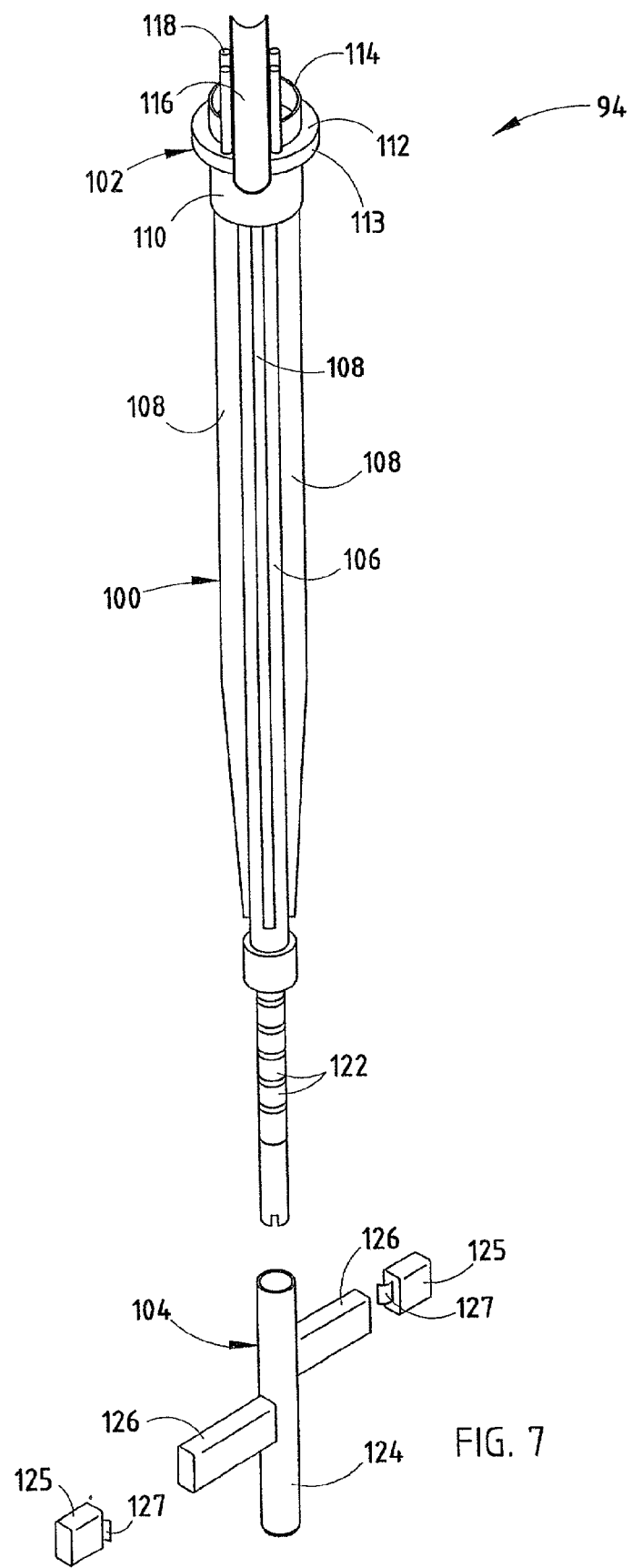
FIG. 7 is a perspective view of a vertical member of the wind powered generator of the present invention.
Figure 10:
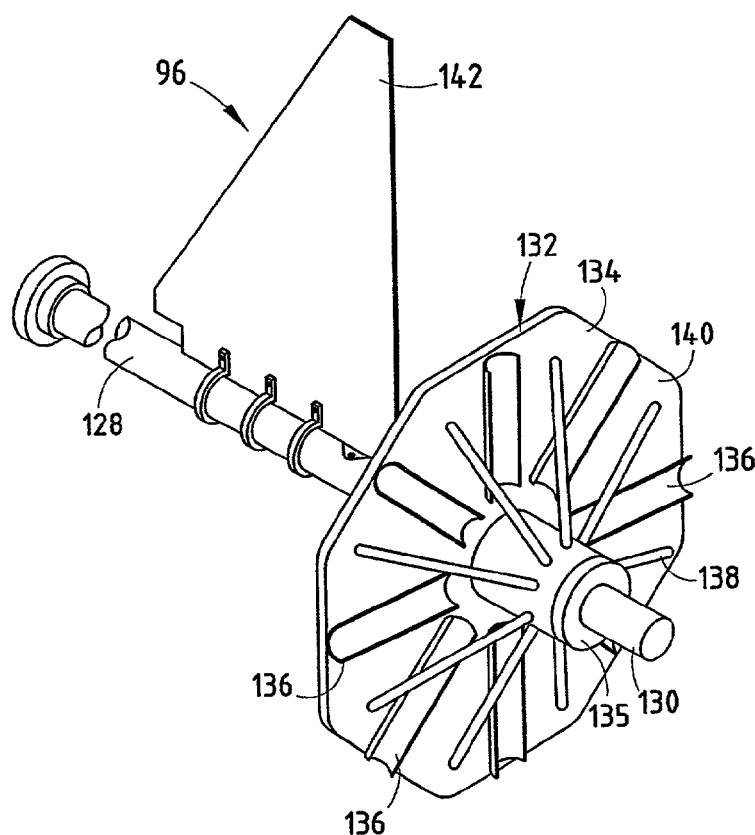
FIG. 10 is a perspective view of a horizontal member of the wind powered generator of the present invention.
Figure 11:
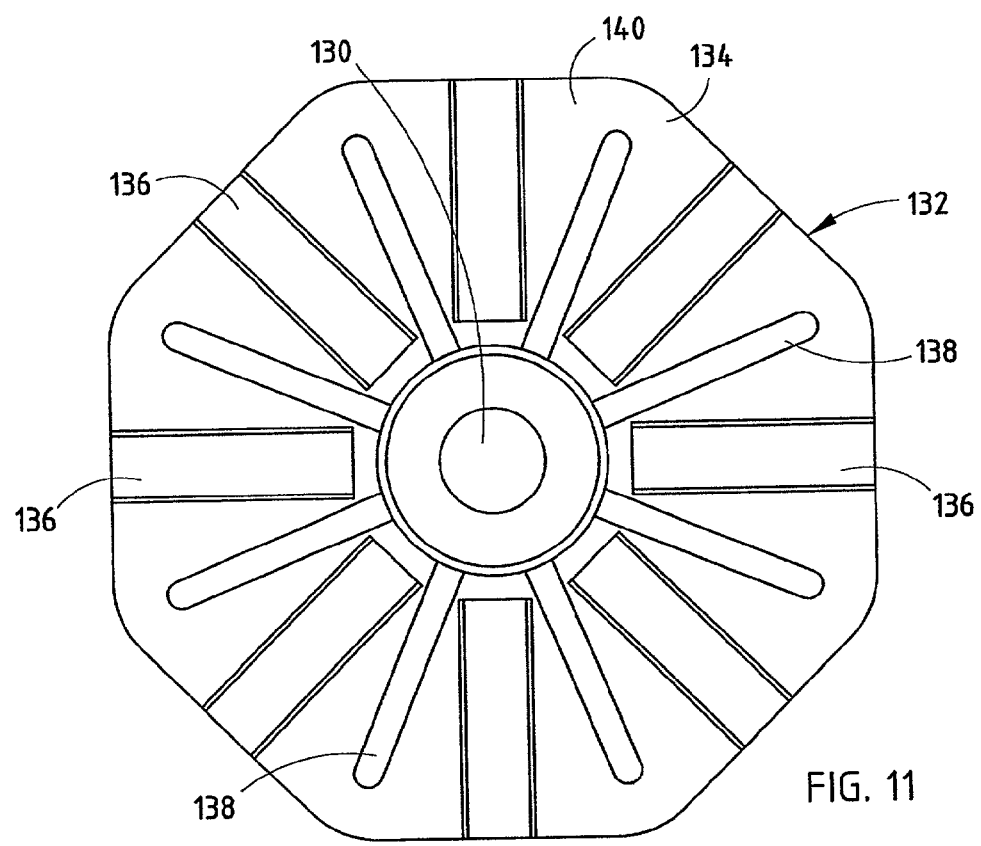
FIG. 11 is a front view of the horizontal member of the wind powered generator of the present invention.
Figure 12:
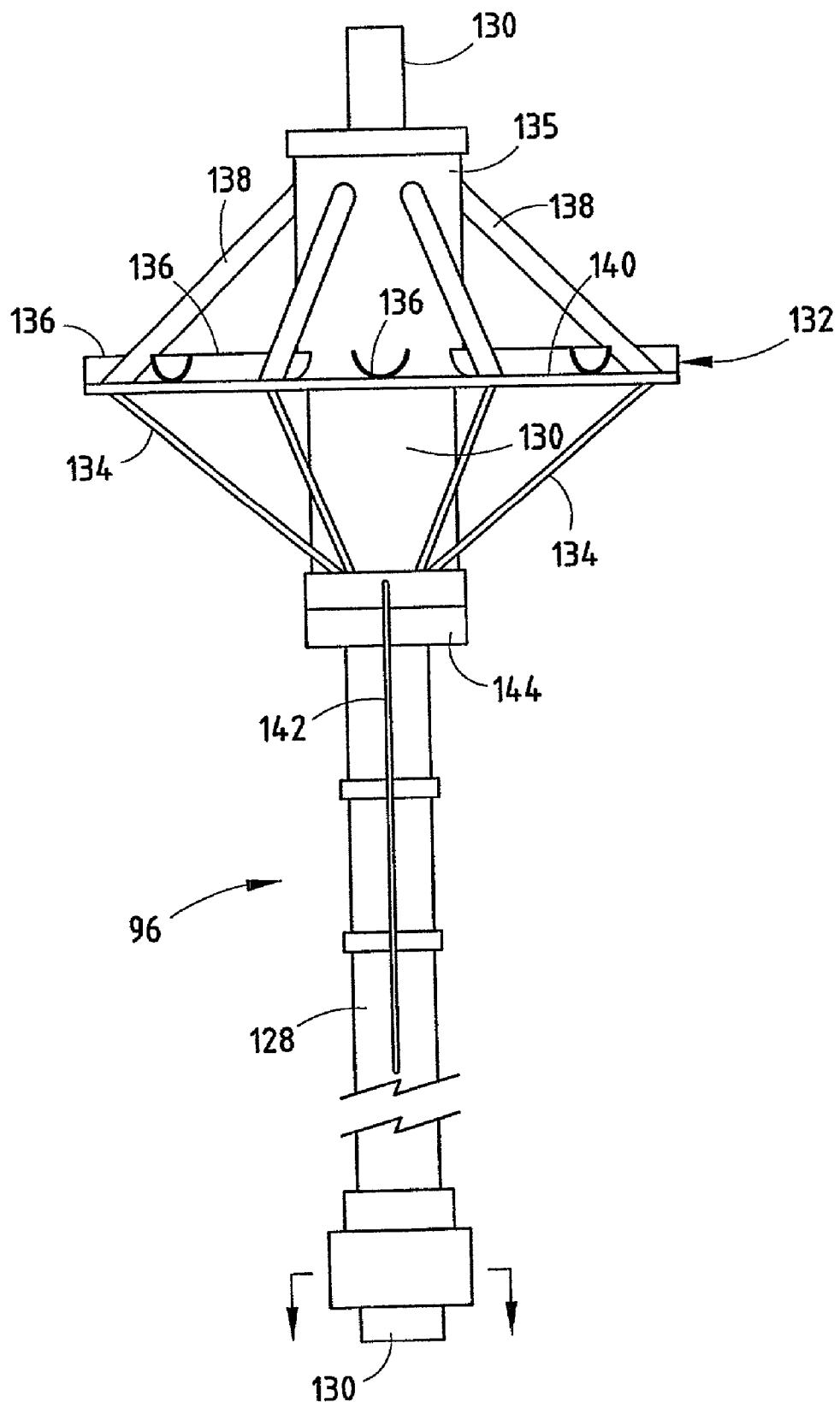
FIG. 12 is a perspective view of the horizontal member of the wind powered generator of the present invention.

In the illustrated example, the wind powered generator 12 (FIG. 6) is raised into the wind a distance above the ground for converting the mechanical energy of the wind into electrical power. The wind powered generator 12 includes a vertical leg 94, a horizontal leg 96, the airfoils 16 connected by spars 98 to the horizontal leg 96 and the electrical generation assembly 18. The vertical leg 94 (FIGS. 7–9) connects the wind powered generator 12 to the tower 14. The vertical leg 94 has a splined shaft 100, a pivot cap 102 and an electrical transfer device 104. The splined shaft 100 includes an elongated tube 106 and four splines 108 extending radially from the elongated tube 106 along the length thereof at every 90° on the outside surface thereof. The pivot cap 102 is connected to an end of the elongated tube 106 and includes a guide ring 110, a bearing plate 112 with a downwardly depending skirt 113, an extension ring 114, a U-shaped half-pipe member 116, connecting bolts 118 and top U-bolts 120. The bearing plate 112 is connected to the end of the elongated tube 106. The guide ring 110 extends from a bottom surface of the bearing plate 112 and surrounds a top portion of the elongated tube 106 and a top of the splines 108. The extension ring 114 extends from a top surface of the bearing plate 112 and has the U-shaped half-pipe member 116 connected to a top thereof. The connecting bolts 118 also extend from the top of the bearing plate 112, with one connecting bolt 118 abutting a side edge of the U-shaped half-pipe member 116 and the extension ring 114. As seen in FIG. 6, the U-shaped half-pipe member 116 is configured to accept the horizontal leg 96 of the wind powered generator 12 and the top U-bolts 120 wrap around a top surface of the horizontal leg 96 and engage the connecting bolts 118 to connect the horizontal leg 96 to the vertical leg 94. The U-shaped half-pipe member 116 is preferably located off center (FIG. 8) on the extension ring 114. As discussed in more detail below, the U-shaped half-pipe member 116 is located off-center to help rotate the airfoils 16 of the wind powered generator 12 directly into the wind. The illustrated vertical leg 94 includes an electrical circuit for transferring electrical power from the power generation assembly 18 to a remote source. The electrical circuit includes a first set of electrical wires 123 from the electrical generation assembly 18 (see FIG. 6) that extend into the extension ring 114, through the bearing plate 112, and through the center of the elongated tube 106 to supply electricity from the electrical generation assembly 18 and the horizontal leg 96 to the vertical leg 94. The first set of electrical wires 123 also extends through the elongated tube 106 below the splines 108 and contacts a pair of contact rings 122 located about the outer periphery of the elongated tube 106 below a bottom edge of the splines 108. The electrical transfer device 104 includes an outer tube 124 that slips over the end of the elongated tube 106. The electrical transfer device 104 also includes a pair of staggered contact housings 126 extending outwardly from the outer tube 24 on opposite sides thereof. The contact housings 126 are configured to accept leaf contacts to align the leaf contacts 127 with the contact rings 22 on the elongated tube 106, thereby creating an electrical circuit between the wiring within the elongated tube 106 and the leaf contacts 127. The leaf contacts 127 are connected to a second set of electrical wires 125 that supplies the power from the wind powered generator 12 to the remote source (see FIGS. 1 and 2).

In the illustrated example, the horizontal leg 96 (FIGS. 10–13) of the wind powered generator 12 connects the airfoils 16 and the electrical generation assembly 18 to the vertical leg 94. The horizontal leg 96 includes an outer fixed rod 128 positioned in the U-shaped half-pipe member 116 of the vertical leg 94 of the wind powered generator 12 and connected thereto with the U-bolts 120. The horizontal leg 96 also includes an inner rotatable rod 130 located within the outer fix rod 128 and a hub 132 connected to an end of the inner rotatable rod 130 extending from a first end 144 of the outer fixed rod 128. The hub 132 includes an octagonal plate 134, a plurality of spar retaining half pipes 136, an enlarged sleeve 135, a plurality of front trusses 138 and a plurality of rear trusses 139. The enlarged sleeve 135 is connected to the end of the inner rotatable rod 130 extending from the first end 144 of the outer fix rod 128. The octagonal plate 134 is located on the enlarged sleeve 135 with a front surface 140 of the octagonal plate 134 being perpendicular to an outside surface of the enlarged sleeve 135. The front trusses 138 extend from the front surface 140 of the octagonal plate 134 at a point adjacent an angle on the circumferential surface of the octagonal place 134 to the enlarged sleeve 135 at a point distal the front surface 140 of the octagonal plate 134 to provide support and stability to the octagonal plate 134. Likewise, the rear trusses 139 extend from a rear surface 141 of the octagonal plate 134 at a point adjacent an angle on the circumferential surface of the octagonal plate 134 to the enlarged sleeve 135 at a point distal the rear surface 141 of the octagonal plate 134 to provide further support and stability to the octagonal plate 134. Each of the spar retaining half-pipes 136 are connected to the front surface 140 of the octagonal plate 134 and extend radially from the enlarged sleeve 135 toward a flat edge of the octagonal plate 134. As explained in more detail below, the spars 98 are connected to the hub 132 by the spar retaining half-pipes 136. The horizontal leg 96 also includes a fin 142 extending radially from and fixed to the outer fixed rod 128. The fin 142 assists in positioning the airfoils 16 into the wind. The electrical generation assembly 18 is fixed to a second end 146 of the outer fixed rod 128 and an end of the inner rotatable rod 130 extending from the second end 146 of the outer fixed rod 128.

Figure 14:
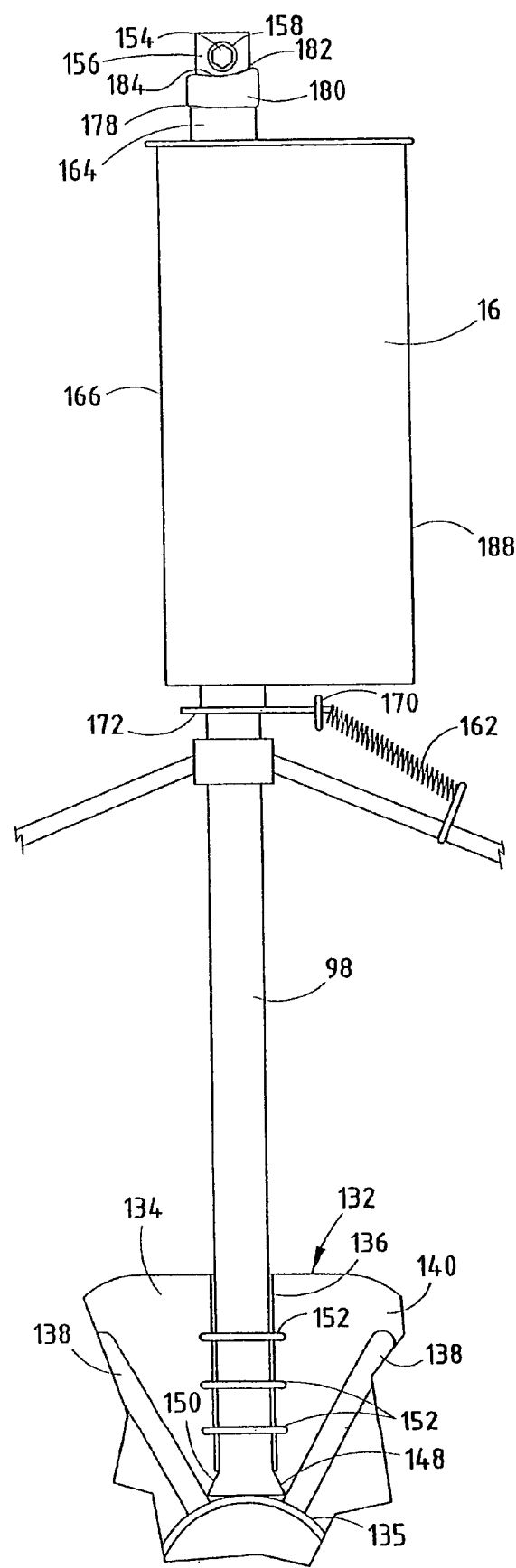
FIG. 14 is an enlarged front view of the spar and the airfoil of the present invention.
Figure 15:
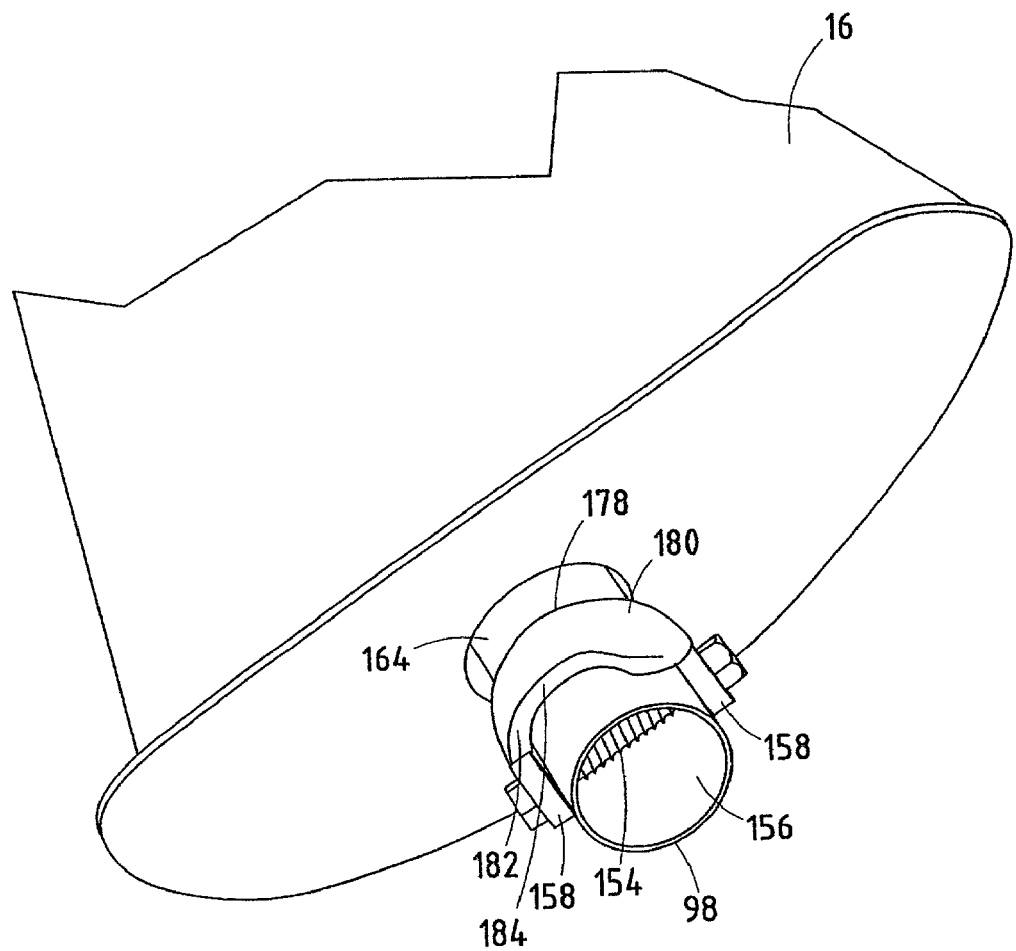
FIG. 15 is a perspective view of the spar and the airfoil of the present invention.

The illustrated spars 98 (FIG. 14) of the present invention connect the airfoils 16 to the hub 132 of the horizontal leg 96. Each of the spars 98 has a flared end 148 for connecting the spar 90 to the hub 32. As seen in FIG. 14, the spar 98 is placed within the spar retaining half-pipe 136 of the hub 132 with the flared end 148 of the spar 98 being located between an inner end edge 150 of the spar retaining half-pipe 136 and the enlarged sleeve 135. Inverted U-bolts 152 retain the spars 98 within the spar retaining half-pipe 136 by wrapping around the spars 98 and the spar retaining half-pipe 136 and being connected to the octagonal plate 134 of the hub 132. An outer annular end 156 of the spar 98 includes a bolt 154 therethrough which is aligned with the diameter of the spar 98. A disc-shaped cam 158 is connected to each end of the bolt 198. The disc-shaped cams 158 are positioned on opposite sides of the outer annular end 156 of the spar 98. An octagonal brace 160 is connected to an approximate midpoint of the spars 98 of each of the spars 98 for stabilizing the spars 98. The octagonal brace 160 also includes eight springs 162 connected to the octagonal brace 160 and the airfoils 16. As explained in more detail below, a combination of the disc-shaped cam 158 of the spar 98 and the spring 162 assists in rotating the airfoils 16 out of the wind as wind speed increases and rotating the airfoils 16 into the wind as wind speed decreases.

In the illustrated example, the airfoils 16 (FIGS. 12–14) power the electrical generation assembly 118 by rotating the spars 98, the hub 132 and the inner rotatable rod 130 to produce power in the electrical generation assembly 18. Preferably, the wind powered generator 12 includes eight airfoils 16 and associated spars 98 with at least six airfoils 16 being preferred, and it is contemplated that the wind powered generator 12 could have two or more airfoils 16. Each of the airfoils 16 includes a rib running perpendicular to the spar 98, thereby separating the airfoil into chambers. Each airfoil 16 preferably incorporates a slight twist along its span or cord to improve an airfoil angle of attack to the wind (i.e., the outer edge of the airfoil 16 is traveling faster than the inner edge of the airfoil 16). The twist of the airfoils 16 improves an airfoil angle of attack because air flowing over the surface of the airfoil 16 is the composite of two vectors, the speed of the true wind which is perpendicular to the rotational plane of the airfoils 16 and the wind over the airfoil 16 caused by a movement of the airfoil 16 at right angles to the true wind. Therefore, the airfoil 16 experiences an apparent wind "ahead" of its movement. This "apparent" wind is faster and more pivoted to the airfoil movement as the airfoil 16 speed increases further from a center of rotation of the airfoils 16.

The airfoils 16 of the illustrated invention include a tube 164 extending longitudinally through the airfoil 16 adjacent a leading edge 166 of the airfoils 16. The spar 98 is inserted into the tube 164 to connect the airfoil 16 to the spar 98. Preferably, the spar has an outer diameter of 1⅞ inch and the tube 164 has an inner diameter of 2 inches, thus allowing the airfoil to rotate freely about the spar 98. An inner end 168 of the tube 164 of the airfoil 16 includes a diamond shaped flange 170 having a central opening 172 for accepting the spar 98. The spring 162 connected to the octagonal brace 160 is also connected to a side portion 174 of the diamond shaped flange 170. The spring 162 is tensioned to bias the side portion 174 of the diamond shaped flange 170 towards the connection point of the spring 162 to the octagonal brace 160. Consequently, the airfoils 16 are biased into position wherein the leading edge 166 of the airfoils 16 is in the direction of rotation and an upwind face 176 of the airfoils 16 is facing the wind. The spring 162 also biases the airfoil 16 towards the hub 132. An outer end 178 of the tube 164 of the airfoil 16 has a circular cam 180 attached to an end thereof. The circular cam 180 has an axis colinear with the tube 164 and accepts the spar 98 therethrough. The circular cam 180 works with the disc-shaped cam 158 of the spar 98 to move the airfoil 16 out of the wind as wind speed increases.

Figure 13:
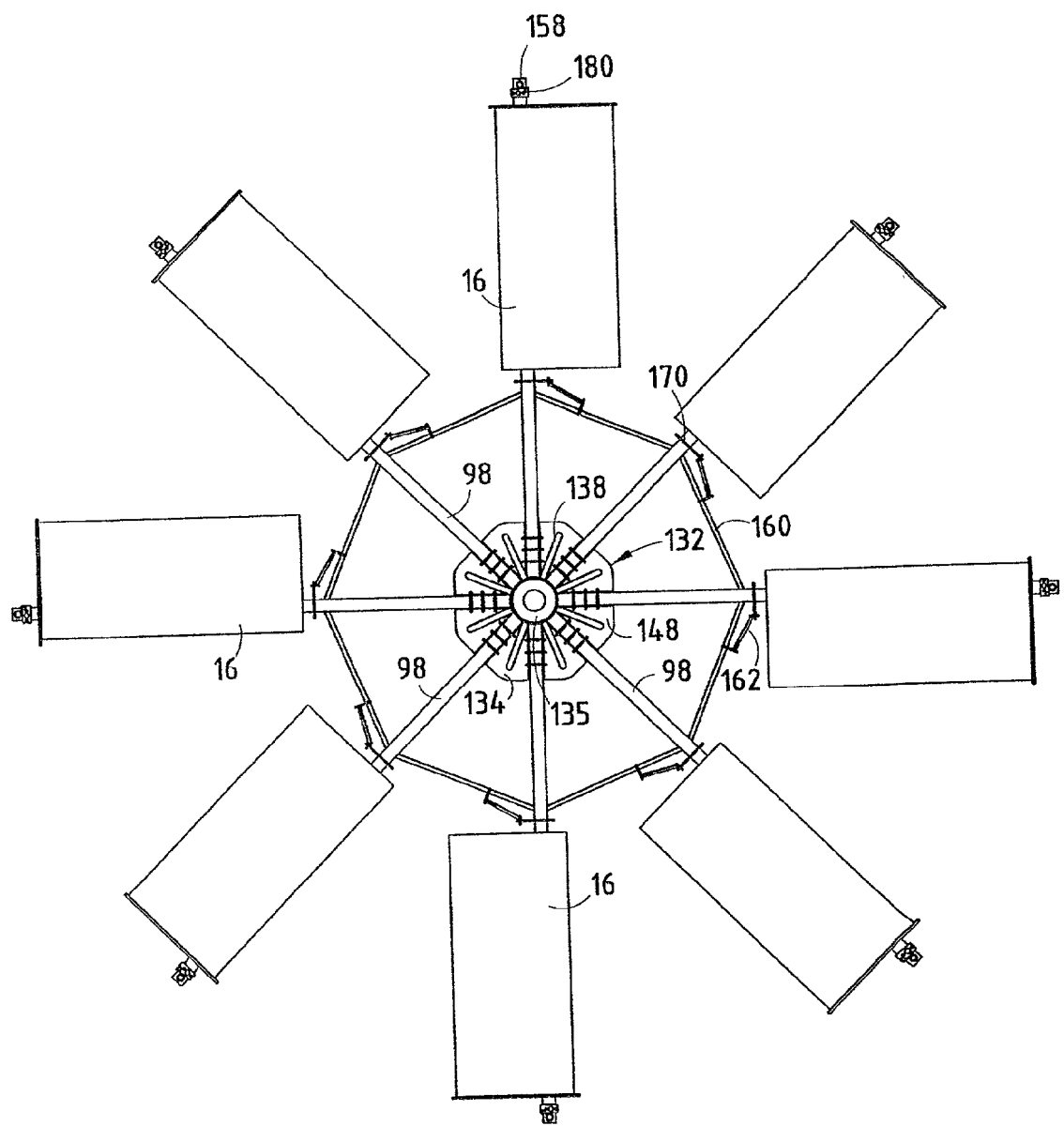
FIG. 13 is a front view of a hub of the horizontal member, spars and airfoils of the wind powered generator.

The illustrated airfoils 16 will move out of the wind as wind speed increases, thereby maintaining the rotational speed of the hub 132 substantially constant and protecting the wind powered electrical generation system 10 from damage. During initial operation of the wind powered electrical generation system 10, the upwind face 176 of the airfoil 16 will face the wind at approximately a 90° angle. As wind speed and the rotation speed of the hubs 132, spars 98 and airfoils 16 increase, centrifugal force will force the airfoils 16 to move outward along the spar 98 towards the outer annular ends 156 thereof. Additionally, the force of the wind will force the upwind faces 176 of the airfoils 16 rearward. As the airfoil 16 moves outward, the cam 180 of the airfoil 16 will abut the disc-shaped cams 158 of the spar 98. As seen in FIGS. 13 and 14, the circular cam 180 has a top edge surface 182 having a pair of U-shaped valleys 184. When the airfoil 16 is in its innermost position, the disc-shaped cams 158 of the spars 98 are located adjacent a peak 186 of the top edge surface 182 of the circular cam 180. As the airfoil 116 moves outward, the disc-shaped cam 158 will abut the top edge surface 182 of the circular cam 180 and the disc-shaped cam 158 will be forced into the bottom of the U-shaped valleys 184 of the top edge surface 182 of the circular cam 180. Since the circular cams 180 will abut the disc-shaped cam 158, the combination is considered to be a double cam. Consequently, a trailing edge 188 of the airfoil 16 will move out of the wind as the circular cam 180 rotates. Therefore, less wind will be contacting the upwind surface 176 of the airfoil 16, thereby slowing the rotation of the spars 98 and the hub 132. Consequently, the rotation of the spars 98 and the hub 132 can remain substantially constant regardless of wind speed. As the wind speed reduces, the spring 162 will pull the diamond shaped flange 170 of the airfoil 16 downward and will cause the airfoil 16 to rotate upon the spar 98. Consequently, the disc-shaped cam 158 of the spar 98 will abut the top edge surface 182 of the circular cam 180 to force the disc-shaped cam 158 into contact with the peak 186 of the top edge surface 182 of the circular cam 180. Additionally, since the spar 98 is located adjacent the leading edge of the airfoil 16, the air pressure from the wind on the trailing edge of the airfoil will be greater than the air pressure at the leading edge of the airfoil 16, thereby forcing the airfoil 16 to rotate rearward as the wind increases. Therefore, the trailing edge 188 of the airfoil 16 will rotate into the wind, thereby causing the wind to strike a greater portion of the airfoil 16 and cause the spars 98 and hub 132 to rotate at a greater speed.

In the illustrated example, the electrical generation assembly 18 converts the mechanical energy from the rotation of the airfoils 16 into electrical power. The electrical generation assembly 18 includes a generator 190, a generator housing 192, a first wheel 194, a second wheel 196, a first tread 198 and a second tread 200. The generator housing 192 holds the generator 190 in position relative to the vertical leg 94 of the wind powered generator 12 and is fixed to a second end 146 of the outer fix rod 128 of the vertical leg 94 of the wind powered generator 12. The generator 190 is preferably permanent magnet DC generator. The first wheel 194 is connected to the end of the inner rotatable rod 130 of the horizontal leg 96 that extends from the second end 146 of the outer fix rod 128. Consequently, the first wheel 194 rotates with the inner rotatable rod 128, the hub 132, the spars 98 and the airfoils 16. The second wheel 196 is connected to the generator housing 192 and has an axis of rotation parallel to the axis of rotation of the first wheel 194. The second wheel 196 includes a first circular sheave 202 extending from a face of the second wheel 200. The first tread 198 extends around an outside surface 204 of the first wheel 194 and the first circular sheave 202 of the second wheel 196. Therefore, the second wheel 196 and the first circular sheave 202 will rotate with the first wheel 194. Furthermore, since the outer surface of the first sheave 202 has a smaller circumference than the first wheel 194, the first circular sheave 202 and the second wheel 196 will rotate at a faster speed than the first wheel 194. The generator 190 includes an input shaft 206 aligned with the outside surface 208 of the second wheel 196. The second tread 202 wraps around the outside surface 208 of the second wheel 196 and the input shaft 206. Consequently, the input shaft 206 of the generator 190 will rotate with the second wheel 196, the first wheel 194, the inner rotatable rod 130 and the hub 132 of the horizontal leg 96, the spars 98 and the airfoils 16. The rotation of the input shaft 206 of the generator 190 produces power in the generator 190 as is known to those well skilled in the art. The first set of electrical wires 123 extend from the generator 190 along the horizontal leg 96 and down the vertical leg 94 of the wind powered generator 12 as discussed above for powering objects located remotely from the wind powered electrical generation system 10.

The illustrated wind powered electrical generation system 10 can be packaged as an assembly and easily constructed in use by anyone. First, the lowermost tower section 20 of the portable tower 14 is preferably connected at a lower end to cement in the ground or beside or on top of a building. The upper tower section 22 or the remaining lower tower sections 20, depending on the total number of lower tower sections 20, are then connected to the lowermost lower tower section 20 using the vertical braces 36. Finally, if not already done so, the upper tower section 22 is connected to a top portion of the upper most lower tower section 20. Additionally, the carriage 46 can be positioned on the elevator 24 at any time during the construction of the portable tower 14 by inserting the first side guide 45 and second side guide 47 of the vertical track 44 within the grooves 58 of the carriage 46. After the portable tower 14 is built and the carriage 46 is placed within the vertical track 44 of the elevator 24, the cable 88 of the carriage raising assembly 84 is connected to the cross plate 80 of the carriage 46 at one end, wrapped over the pulley 90 at the top of the portable tower 14 and connected at a second end to the winch or windlass 86. Therefore, the carriage 46 can be raised or lowered vertically along the portable tower 14. The wind powered generator 12 is then assembled by connecting the airfoils 16 to the spars 98, the spars 98 to the hub 132, the octagonal brace 160 to the spars 98 and the airfoils 16, the hub 132 to the inner rotatable rod 130, and the electrical generation assembly 18 to the inner rotatable rod 130 and outer fixed rod 128 as described above. Furthermore, the horizontal leg 96 of the wind powered generator is connected to the vertical leg 94 as described above. At this point, the carriage 46 is lowered to the bottom of the portable tower 14 and the vertical leg 94 of the wind powered generator 12 is inserted into the top pivot ring 50 of the carriage 46 until the bearing plate 112 of the vertical leg 94 rests on the roller bearings 55 of the carriage 46. The first middle support piece 62 is then connected to the second middle support piece 64 of the middle support 54 of the carriage 46 using fasteners as described above, thereby capturing a middle portion of the elongated tube 106 of the vertical leg 94 within the ring formed by the first semicircular channel 66 of the first middle support piece 62 and the second semi-circular channel 74 of the middle support 54. The leaf contacts 127 are then inserted into the contact housings 126 of the electrical transfer device 104. The elongated tube 106 of the electrical transfer device 104 is slid onto an end of the elongated tube 106 of the vertical leg 94 until the leaf contacts 127 contact the contact rings 122 of the vertical leg 94. Finally, the second lower support piece 69 is connected to the first lower support piece 67 of the lower support 56 of the carriage 46 to maintain the electrical transfer device 104 on the elongated tube 106 of the vertical leg 94 and to stabilize the bottom of the elongated tube 106 of the vertical leg 94.

Once the wind powered electrical generation system 10 is filly assembled, the carriage 46 can be raised with the carriage raising assembly 84 until the carriage 46 is located at the top of the portable tower 14. Once the carriage 46 is located at the top of the portable tower 14, the vertical fin 142 will rotate the horizontal leg 96 of the wind powered generator 12 as a side surface of the fin 142 is being pushed by the wind to position the airfoils 16 into the wind. The U-shaped half-pipe member 116 of the vertical leg 94 of the wind powered generator 12 is positioned off center and a surface of the fin 142 connected to the horizontal leg 96 of the wind powered generator has a larger surface on one side of the pivot axis of the vertical leg 94, thereby allowing the horizontal leg 96 and the vertical leg 94 of the wind powered generator 12 to rotate if the wind powered generator 12 is raised into the wind when the surfaces of the airfoils 16 are parallel to the wind such that the airfoils 16 themselves would not rotate the wind powered generator 12 into the wind.

The wind powered electrical generation system 10 of the present invention easily allows anyone to build an electrical generation system on any part of their property. Furthermore, since the airfoils 16 of the wind powered generator 12 will rotate out of the wind, the portable tower 14 does not require a large base. Therefore, the wind powered electrical generation system 10 can be placed adjacent dwellings, even in residential areas. Furthermore, the rotation of the airfoils 16 out of the wind upon the spars 98 allows the wind powered electrical generation system 10 to run smoothly and quietly. Additionally, the generator 190 is located upwind of the airfoils 16, thereby minimizing horizontal oscillation of the horizontal leg 98 of the wind powered generator 12. The generator 190 can be located upwind because of the low rotational speed of the airfoil 16 of the wind powered generator 12 and because the airfoils 16 are spaced from the hub 132 and therefore any turbulence created by the generator 190 will not affect the airfoils 16.

The above description is considered that of the preferred embodiment only. Modification of the invention will occur to those skilled in the art and to those who make or use the invention. For example, the upper tower section 22 and the lower tower sections 20 can have diagonal struts extending between the columns for extra rigidity for the tower 14. Furthermore, the terms "front" and "rear" as used herein to described the horizontal leg 96 are relative terms and do not reflect the direction of the wind because the wind powered electrical generation system 10 includes a upwind generator 190 and the wind will contact the rear face of the hub 138 as the wind passes by the hub 138. Therefore, it is understood that the embodiment shown in the drawings and described above is merely for illustrative purposes and not intended to limit the scope of the invention, which is defined by the following claims as interpreted according to the principles of patent law, including the doctrine of equivalents.

The invention claimed is:

1. A portable wind powered generator tower for supporting a wind powered generator comprising:
   a lower tower section including a first vertical column, a second vertical column and a third vertical column, the lower tower further including at least three cross braces, with two of the cross braces being connected to each of the first vertical column, the second vertical column and the third vertical column; and
   an upper tower section including a first upper column, a second upper column and a third upper column, with the first upper column and the second upper column being substantially parallel and the third upper column converging towards the first upper column and the second upper column; and an elevator configured to be connected to a wind powered generator to raise and lower the wind powered generator from the lower tower section to the upper tower section;

wherein the lower tower section is configured to be connected to the upper tower section by connecting a top of the first vertical column of the lower tower section directly below the upper tower section to a bottom of the first upper column of the upper tower section, connecting a top of the second vertical column of the lower tower section directly below the upper tower section to a bottom of the second upper column of the upper tower section, and connecting a top of the third vertical column of the lower tower section directly below the upper tower section to a bottom of the third upper column of the upper tower section; and wherein the elevator is fully assembled and ready to raise and lower the wind powered generator when the lower tower section is connected to the upper tower section.

2. The portable wind powered generator tower of claim 1, wherein:

the elevator includes a vertical track and a carriage; and the carriage is configured to move along the vertical track to raise and lower the wind powered generator.

3. The portable wind powered generator tower of claim 2, wherein:

the vertical track includes a first side guide having a first vertical strip and a second side guide having a second vertical strip; and the carriage includes a first side groove configured to accept the first vertical strip and a second side groove configured to accept the second vertical strip, thereby allowing the carriage to slide along the first vertical strip and the second vertical strip of the vertical track.

4. The portable wind powered generator tower of claim 3, wherein:

the first vertical strip is comprised of a plurality of first vertical strip portions;

the second vertical strip is comprised of a plurality of second vertical strip portions;

the first vertical column of the lower tower section includes one of the first vertical strip portions;

the first upper column includes another one of the first vertical strip portions;

the second vertical column of the one lower tower section includes one of the second vertical strip portions;

the second upper column includes another one of the second vertical strip portions; and the first vertical strip and the second vertical strip are fully assembled when the at least one lower tower section is connected to the upper tower section.

5. The portable wind powered generator tower of claim 2, further including:

a carriage raising assembly including a winch, a cable and a pulley;

wherein the pulley is connected to the upper tower section and the winch is connected to the lower tower section; and wherein the cable is connected to the winch and the carriage, the cable further being wrapped about the pulley whereby the carriage can be raised by rotating the winch to thereby pull the cable about the pulley and raise the carriage.

6. The portable wind powered generator tower of claim 2, wherein:

the carriage includes a pivot ring adapted to allow the wind powered generator to pivot about the carriage when the wind powered generator is located at a top of the upper tower section.

7. The portable wind powered generator tower of claim 6, wherein:

the pivot ring includes a plurality of roller bearings configured to accept a portion of the wind powered generator thereon, thereby allowing the wind powered generator to rotate.

8. The portable wind powered generator tower of claim 2, wherein:

the carriage includes a plurality of contacts configured to contact a rotating portion of the wind powered generator to allow power to be transferred from the wind powered generator to a remote point.

9. A wind powered generator support assembly for supporting a wind powered generator comprising:

a tower; and a vertical elevator on the tower, the elevator including a track and a carriage configured to move along the track, the carriage including a pivot ring configured to accept the wind powered generator therein for allowing the wind powered generator to rotate about the carriage;

wherein the vertical elevator is configured to vertically lift the wind powered generator with the carriage to position the wind powered generator at a top of the tower.

10. The wind powered generator support assembly of claim 9, wherein:

the track includes a first side guide having a first vertical strip and a second side guide having a second vertical strip; and the carriage includes a first side groove configured to accept the first vertical strip and a second side groove configured to accept the second vertical strip, thereby allowing the carriage to slide along the first vertical strip and the second vertical strip of the track.

11. The wind powered generator support assembly of claim 9, wherein:

the pivot ring includes a plurality of roller bearings configured to accept a portion of the wind powered generator thereon, thereby allowing the wind powered generator to rotate.

12. The wind powered generator support assembly of claim 9, wherein:

the carriage includes a plurality of contacts configured to contact a rotating portion of the wind powered generator to allow power to be transferred from the wind powered generator to a remote point.

13. The wind powered generator support assembly of claim 9, further including:

a carriage raising assembly including a winch, a cable and a pulley;

wherein the pulley is connected to an upper portion of the tower and the winch is connected to a lower portion of the tower; and wherein the cable is connected to the winch and the carriage, the cable further being wrapped about the pulley whereby the carriage can be raised by rotating the winch to thereby pull the cable about the pulley and raise the carriage.

14. A wind powered generator support assembly for supporting a wind powered generator comprising:

a tower; and a vertical elevator on the tower, the elevator including a track and a carriage configured to move along the track, the carriage including a pivot ring configured to accept the wind powered generator therein for allowing the wind powered generator to rotate about the carriage;

wherein the vertical elevator is configured to vertically lift the wind powered generator with the carriage to position the wind powered generator at a top of the tower;

the tower comprising a lower tower section and an upper tower section;

the lower tower section including a first vertical column, a second vertical column and a third vertical column, the lower tower section further including at least three cross braces, with two of the cross braces being connected to each of the first vertical column, the second vertical column and the third vertical column; and the upper tower section including a first upper column, a second upper column and a third upper column, with the first upper column and the second upper column being substantially parallel and the third upper column converging towards the first upper column and the second upper column;

the lower tower section being configured to be connected to the upper tower section by connecting a top of the first vertical column of the lower tower section directly below the upper tower section to a bottom of the first upper column of the upper tower section, connecting a top of the second vertical column of the lower tower section directly below the upper tower section to a bottom of the second upper column of the upper tower section, and connecting a top of the third vertical column of the lower tower section directly below the upper tower section to a bottom of the third upper column of the upper tower section; and the track being fully assembled and ready to raise and lower the wind powered generator when the lower tower section is connected to the upper tower section.

15. The wind powered generator support assembly of claim 14, wherein:

the vertical track includes a first side guide having a first vertical strip and a second side guide having a second vertical strip; and the carriage includes a first side groove configured to accept the first vertical strip and a second side groove configured to accept the second vertical strip, thereby allowing the carriage to slide along the first vertical strip and the second vertical strip of the vertical track.

16. The wind powered generator support assembly of claim 15, wherein:

the first vertical strip is comprised of a plurality of first vertical strip portions;

the second vertical strip is comprised of a plurality of second vertical strip portions;

the first vertical column of the lower tower section includes one of the first vertical strips;

the first upper column includes one of the first vertical strips;

the second vertical column of the one lower tower section includes one of the second vertical strips;

the second upper column includes one of the second vertical strips; and the first vertical strip and the second vertical strip are fully assembled when the at least one lower tower section is connected to the upper tower section.

17. The wind powered generator support assembly of claim 16, further including:

a carriage raising assembly including a winch, a cable and a pulley;

wherein the pulley is connected to the upper tower section of the tower and the winch is connected to the lower tower section; and wherein the cable is connected to the winch and the carriage, the cable further being wrapped about the pulley whereby the carriage can be raised by rotating the winch to thereby pull the cable about the pulley and raise the carriage.

18. A wind powered electrical generation system comprising:

a tower including a vertical elevator, the vertical elevator having a track and a carriage configured to move along the track; and a wind powered generator configured to be connected to the carriage, the wind powered generator including a plurality of airfoils and an electric generator;

wherein the wind powered generator can be removably placed within the carriage after the tower has been erected and lifted vertically with the carriage to position the wind powered generator at a top of the tower;

wherein the wind powered generator can be removed from within the carriage after the carriage has been lowered;

wherein the wind powered generator includes a vertical leg; and wherein the vertical leg is configured to be placed within the carriage and rotate relative to the carriage when the wind powered generator is placed within the carriage.

19. The wind powered electrical generation system of claim 18, wherein:

the wind powered generator further includes a horizontal leg including a first shaft and a second shaft, the first shaft being rotatable within the second shaft;

the second shaft of the horizontal leg is connected to an end of the vertical leg;

the airfoils are interconnected to the first shaft; and the generator is connected to the second shaft.

20. The wind powered electrical generation system of claim 19, wherein:

the second shaft of the horizontal leg is connected to an end of the vertical leg at a position off center from an axis of the vertical leg.

21. The wind powered electrical generation system of claim 20, wherein:

the first shaft includes a hub fixed to an end thereof; and spars are connected to the hub, the spars extending from the hub in a position substantially perpendicular to the first shaft.

22. The wind powered electrical generation system of claim 21, wherein:

the airfoils are configured to pivot about the spars and to slide longitudinally along the spars;

the airfoils are biased towards a first end of the spars connected to the hub;

each spar includes a cam member adjacent a second end of the spar opposite to the hub;

each airfoil includes a cam surface configured to engage the cam member on the spar;

the cam member and the cam surface are configured to engage to thereby rotate the airfoils relative to the spars as the airfoils move along the spars towards the second end of the spars.

23. A wind powered generator comprising:

a housing;

a rod configured to rotate within the housing;

at least two spars connected to a hub on the rod and extending radially therefrom;

an airfoil connected to each of the spars at a location distal the rod;

the entire airfoil on each spar being configured to pivot about the spars and to slide longitudinally along the spars;

the airfoils being biased towards a first end of the spars connected to the hub;

each spar including a cam member adjacent a second end of the spar opposite to the hub; and each airfoil including a cam surface configured to engage the cam member on the spar;

wherein the cam member and the cam surface are configured to engage to thereby rotate the airfoils relative to the spars as the airfoils move along the spars towards the second end of the spars.

24. The wind powered generator of claim 23, further including:

an electrical generator connected to the housing.

25. The wind powered generator of claim 24, further including:

a vertical leg connected to the housing;

wherein the housing is connected to an end of the vertical leg at a position off center from an axis of the vertical leg.

26. The wind powered generator of claim 23, wherein:

the rod includes a hub fixed to an end thereof; and the spars are connected to the hub, with the spars extending from the hub in a position substantially perpendicular to the rod.

27. A wind powered electrical generation system comprising:

a tower including an elevator having a carriage, the elevator being configured to move the carriage between a bottom and a top of the tower;

a first member rotatably connected to the carriage, the first member having an axis of rotation substantially parallel to the direction of movement of the carriage;

a second member connected to the first member, the second member having a first end and a second end;

a hub assembly connected to the first end of the second member, the hub assembly including a plurality of spars;

an airfoil connected to each spar; and a generator connected to the second end of the second member;

wherein the spars and the second member will rotate as wind passes the airfoils, thereby powering the generator.

28. The wind powered electrical generation system of claim 27, wherein:

the elevator includes a track, the track including a first side guide having a first vertical strip and a second side guide having a second vertical strip; and the carriage includes a first side groove configured to accept the first vertical strip and a second side groove configured to accept the second vertical strip, thereby allowing the carriage to slide along the first vertical strip and the second vertical strip of the track to move between the top and bottom of the tower.

29. The wind power electrical generation system of claim 27, wherein:

the carriage includes a pivot ring having a plurality of roller bearings configured to accept the first member thereon, thereby allowing the first member to rotate.

30. The wind powered electrical generation system of claim 27, wherein:

the carriage includes a plurality of contacts configured to contact a rotating portion of the first member to allow power to be transferred from the first member to a remote point.

31. The wind powered electrical generation system of claim 27, further including:

a carriage raising assembly including a winch, a cable and a pulley;

wherein the pulley is connected to an upper portion of the tower and the winch is connected to a lower portion of the tower; and wherein the cable is connected to the winch and the carriage, the cable further being wrapped about the pulley whereby the carriage can be raised by rotating the winch to thereby pull the cable about the pulley and raise the carriage.

32. The wind powered electrical generation system of claim 27, wherein:

the airfoils are configured to pivot about the spars and to slide longitudinally along the spars;

the airfoils are biased towards a first end of the spars connected to the hub;

each spar includes a cam member adjacent a second end of the spar opposite to the hub;

each airfoil includes a cam surface configured to engage the cam member on the spar;

the cam member and the cam surface are configured to engage to thereby rotate the airfoils relative to the spars as the airfoils move along the spars towards the second end of the spars.

33. The wind powered electrical generation system of claim 27, wherein:

the second member is connected to an end of the first member at a position off center from an axis of the first member.

34. The wind powered electrical generation system of claim 33, wherein:

the spars extend from the hub in a position substantially perpendicular to the second member.

35. The wind powered electrical generation system of claim 34, wherein:

the airfoils are configured to pivot about the spars and to slide longitudinally along the spars;

the airfoils are biased towards a first end of the spars connected to the hub;

each spar includes a cam member adjacent a second end of the spar opposite to the hub;

each airfoil includes a cam surface configured to engage the cam member on the spar;

the cam member and the cam surface are configured to engage to thereby rotate the airfoils relative to the spars as the airfoils move along the spars towards the second end of the spars.

36. A wind powered electrical generation system comprising:

a tower including an elevator having a carriage, the elevator being configured to move the carriage between a bottom and a top of the tower;

a first member rotatably connected to the carriage, the first member having an axis of rotation substantially parallel to the direction of movement of the carriage;

a second member connected to the first member, the second member having a first end and a second end;

a hub assembly connected to the first end of the second member, the hub assembly including a plurality of spars;

an airfoil connected to each spar; and a generator connected to the second end of the second member;

wherein the spars and the second member will rotate as wind passes the airfoils, thereby powering the generator;

the tower comprising a lower tower section and an upper tower section;

the lower tower section including a first vertical column, a second vertical column and a third vertical column, the lower tower section further including at least three cross braces, with two of the cross braces being connected to each of the first vertical column, the second vertical column and the third vertical column; and the upper tower section including a first upper column, a second upper column and a third upper column, with the first upper column and the second upper column being substantially parallel and the third upper column converging towards the first upper column and the second upper column;

the lower tower section being configured to be connected to the upper tower section by connecting a top of the first vertical column of the lower tower section directly below the upper tower section to a bottom of the first upper column of the upper tower section, connecting a top of the second vertical column of the lower tower section directly below the upper tower section to a bottom of the second upper column of the upper tower section, and connecting a top of the third vertical column of the lower tower section directly below the upper tower section to a bottom of the third upper column of the upper tower section;

the elevator including a track upon which the carriage moves; and the track being fully assembled and ready to raise and lower the wind powered generator when the lower tower section is connected to the upper tower section.

37. The wind powered electrical generation system of claim 36, wherein:

the track includes a first side guide having a first vertical strip and a second side guide having a second vertical strip; and the carriage includes a first side groove configured to accept the first vertical strip and a second side groove configured to accept the second vertical strip, thereby allowing the carriage to slide along the first vertical strip and the second vertical strip of the track.

38. The wind powered electrical generation system of claim 37, wherein:

the first vertical strip is comprised of a plurality of first vertical strip portions;

the second vertical strip is comprised of a plurality of second vertical strip portions;

the first vertical column of the lower tower section includes one of the first vertical strips;

the first upper column includes one of the first vertical strips;

the second vertical column of the one lower tower section includes one of the second vertical strips;

the second upper column includes one of the second vertical strips; and the first vertical strip and the second vertical strip are fully assembled when the at least one lower tower section is connected to the upper tower section.

39. The wind powered electrical generation system of claim 38, further including:

a carriage raising assembly including a winch, a cable and a pulley;

wherein the pulley is connected to the upper tower section and the winch is connected to the lower tower section; and wherein the cable is connected to the winch and the carriage, the cable further being wrapped about the pulley whereby the carriage can be raised by rotating the winch to thereby pull the cable about the pulley and raise the carriage.

40. A portable wind powered generation system comprising:

a tower having an upper tower section and a lower tower section, the upper tower section and the lower tower section being removably connected;

a wind powered generator; and an elevator connected to the tower, the elevator being able to move between the lower tower section and the upper tower section of the tower;

wherein the wind powered generator is configured to be connected to the elevator to raise the wind powered generator from the lower tower section to the upper tower section; and wherein the wind powered generator can be unconnected from the elevator and the upper tower section can be unconnected from the lower tower section, thereby allowing the portable wind powered generator assembly to be easily transported and erected.

41. A portable wind powered generation system comprising:

a tower having an upper tower section and a lower tower section, the upper tower section and the lower tower section being removably connected;

a wind powered generator; and an elevator connected to the tower, the elevator being able to move between the lower tower section and the upper tower section of the tower;

wherein the wind powered generator is configured to be connected to the elevator to raise the wind powered generator from the lower tower section to the upper tower section; and wherein the wind powered generator can be unconnected from the elevator and the upper tower section can be unconnected from the lower tower section, thereby allowing the portable wind powered generator assembly to be easily transported and erected;

the lower tower section including a first vertical column, a second vertical column and a third vertical column, the lower tower section further including at least three cross braces, with two of the cross braces being connected to each of the first vertical column, the second vertical column and the third vertical column; and the upper tower section including a first upper column, a second upper column and a third upper column, with the first upper column and the second upper column being substantially parallel and the third upper column converging towards the first upper column and the second upper column;

the lower tower section being configured to be connected to the upper tower section by connecting a top of the first vertical column of the lower tower section directly below the upper tower section to a bottom of the first upper column of the upper tower section, connecting a top of the second vertical column of the lower tower section directly below the upper tower section to a bottom of the second upper column of the upper tower section, and connecting a top of the third vertical column of the lower tower section directly below the upper tower section to a bottom of the third upper column of the upper tower section;

the elevator including a carriage and a track upon which the carriage moves; and the track being fully assembled and ready to raise and lower the wind powered generator when the one lower tower section is connected to the upper tower section.

42. The wind powered electrical generation system of claim 41, wherein:

the vertical track includes a first side guide having a first vertical strip and a second side guide having a second vertical strip; and the carriage includes a first side groove configured to accept the first vertical strip and a second side groove configured to accept the second vertical strip, thereby allowing the carriage to slide along the first vertical strip and the second vertical strip of the vertical track.

43. The wind powered electrical generation system of claim 42, wherein:

the first vertical strip is comprised of a plurality of first vertical strip portions;

the second vertical strip is comprised of a plurality of second vertical strip portions;

the first vertical column of the lower tower section includes one of the first vertical strips;

the first upper column includes one of the first vertical strips;

the second vertical column of the one lower tower section includes one of the second vertical strips;

the second upper column includes one of the second vertical strips; and the first vertical strip and the second vertical strip are fully assembled when the at least one lower tower section is connected to the upper tower section.

44. The wind powered electrical generation system of claim 43, further including:

a carriage raising assembly including a winch, a cable and a pulley;

wherein the pulley is connected to the upper tower section and the winch is connected to the lower tower section; and wherein the cable is connected to the winch and the carriage, the cable further being wrapped about the pulley whereby the carriage can be raised by rotating the winch to thereby pull the cable about the pulley and raise the carriage.

45. The wind powered electrical generation system of claim 44, wherein:

the carriage includes a pivot ring having a plurality of roller bearings configured to accept a portion of the wind powered generator thereon, thereby allowing the wind powered generator to rotate.

46. The wind powered electrical generation system of claim 45, wherein:

the carriage includes a plurality of contacts configured to contact a rotating portion of the wind powered generator to allow power to be transferred from the wind powered generator to a remote point.

47. The wind powered electrical generation system of claim 46, wherein:

the wind powered generator includes:

a housing;

a rod configured to rotate within the housing;

at least two spars connected to the rod and extending radially therefrom; and the airfoils are connected to each of the spars.

48. The wind powered electrical generation system of claim 47, wherein:

the airfoils are configured to pivot about the spars and to slide longitudinally along the spars;

the airfoils are biased towards a first end of the spars connected to the hub;

each spar includes a cam member adjacent a second end of the spar opposite to the hub;

each airfoil includes a cam surface configured to engage the cam member on the spar;

the cam member and the cam surface are configured to engage to thereby rotate the airfoils relative to the spars as the airfoils move along the spars towards the second end of the spars.

49. The wind powered electrical generation system of claim 48, wherein:

the wind powered generator further includes a vertical leg;

the vertical leg is configured to be placed within the carriage and rotate relative to the carriage when the wind powered generator assembly is placed within the carriage.

50. The wind powered electrical generation system of claim 49, wherein:

the wind powered generator further includes a horizontal leg including a first shaft and a second shaft, the first shaft being rotatable within the second shaft;

the second shaft of the horizontal leg is connected to an end of the vertical leg;

the airfoils are interconnected to the first shaft; and the generator is connected to the second shaft.

51. The wind powered electrical generation system of claim 50, wherein:

the second shaft of the horizontal leg is connected to an end of the first rod of the vertical leg at a position off center from an axis of the vertical leg.

52. The wind powered electrical generation system of claim 51, wherein:

the first shaft includes a hub fixed to an end thereof; and spars are connected to the hub, the spars extending from the hub in a position substantially perpendicular to the first shaft.

53. The wind powered electrical generation system of claim 52, wherein:

the airfoils are configured to pivot about the spars and to slide longitudinally along the spars the airfoils are biased towards a first end of the spars connected to the hub;

each spar includes a cam member adjacent a second end of the spar opposite to the hub;

each airfoil includes a cam surface configured to engage the cam member on the spar;

the cam member and the cam surface are configured to engage to thereby rotate the airfoils relative to the spars as the airfoils move along the spars towards the second end of the spars.

54. A wind powered generator comprising:

a housing;

a rod configured to rotate within the housing;

at least two spars connected to a hub on the rod and extending radially therefrom;

an airfoil connected to each of the spars at a location distal the rod;

the airfoils being configured to pivot about the spars and to slide longitudinally along the spars;

the airfoils being biased towards a first end of the spars connected to the hub;

each spar including a cam member adjacent a second end of the spar opposite to the hub; and each airfoil including a cam surface configured to engage the cam member on the spar;

wherein the cam member and the cam surface are configured to engage to thereby rotate the airfoils relative to the spars as the airfoils move along the spars towards the second end of the spars; and wherein a biasing member biases the airfoils towards the first end of the spars connected to the hub, the biasing member biasing the airfoils in a biasing direction non-parallel to a sliding direction of the airfoils, the sliding direction being parallel to a sliding direction of the airfoils along the spars.

55. A wind powered generator comprising:

a housing;

a rod configured to rotate within the housing;

at least two spars connected to a hub on the rod and extending radially therefrom;

an airfoil connected to each of the spars at a location distal the rod;

the airfoils being configured to pivot about the spars and to slide longitudinally along the spars;

the airfoils being biased towards a first end of the spars connected to the hub;

each spar including a cam member adjacent a second end of the spar opposite to the hub; and each airfoil including a cam surface configured to engage the cam member on the spar;

wherein the cam member and the cam surface are configured to engage to thereby rotate the airfoils relative to the spars as the airfoils move along the spars towards the second end of the spars; and wherein the spars extend through the airfoils at a position closer to a leading edge of rotation of the airfoils than a trailing edge.

56. A wind powered generator comprising:

a housing;

a rod configured to rotate within the housing;

at least two spars connected to a hub on the rod and extending radially therefrom;

an airfoil connected to each of the spars at a location distal the rod;

the airfoils being configured to pivot about the spars and to slide longitudinally along the spars;

the airfoils being biased towards a first end of the spars connected to the hub;

each spar including a cam member adjacent a second end of the spar opposite to the hub; and each airfoil including a cam surface configured to engage the cam member on the spar;

wherein the cam member and the cam surface are configured to engage to thereby rotate the airfoils relative to the spars as the airfoils move along the spars towards the second end of the spars;

wherein a force from wind applied to the airfoil lessens over an entire length of the spars as the airfoils pivot.

57. A wind powered electrical generation system comprising:

a tower including a vertical elevator, the vertical elevator having a track and a carriage configured to move along the track; and a wind powered generator configured to be connected to the carriage, the wind powered generator including a plurality of airfoils and an electric generator;

wherein the wind powered generator can be removably placed within the carriage after the tower has been erected and lifted vertically with the carriage to position the wind powered generator at a top of the tower; and wherein the wind powered generator can be removed from within the carriage after the carriage has been lowered; and wherein the carriage includes a pivot ring configured to accept the wind powered generator therein; and the pivot ring includes a plurality of roller bearings configured to accept a portion of the wind powered generator thereon, thereby allowing the wind powered generator to rotate.

58. A wind powered electrical generation system comprising:

a tower including a vertical elevator, the vertical elevator having a track and a carriage configured to move along the track; and a wind powered generator configured to be connected to the carriage, the wind powered generator including a plurality of airfoils and an electric generator;

wherein the wind powered generator can be removably placed within the carriage after the tower has been erected and lifted vertically with the carriage to position the wind powered generator at a top of the tower; and wherein the wind powered generator can be removed from within the carriage after the carriage has been lowered; and wherein the carriage includes a plurality of contacts configured to contact a rotating portion of the wind powered generator to allow power to be transferred from the wind powered generator to a remote point.

59. A wind powered generator comprising:

a housing;

a rod configured to rotate within the housing;

at least six spars connected to the rod and extending radially therefrom;

an airfoil connected to each of the spars at a location distal the rod; and a generator located upwind of the spars and interconnected to the rod;

wherein the spars and the rod will rotate as wind passes the airfoils, thereby powering the generator; and a vertical leg connected to the housing;

wherein the housing is connected to an end of the vertical leg at a position off center from an axis of the vertical leg.

60. A wind powered electrical generation system comprising:

a tower including a vertical elevator, the vertical elevator having a track and a carriage configured to move along the track; and a wind powered generator configured to be connected to the carriage, the wind powered generator including a plurality of airfoils and an electric generator;

wherein the wind powered generator can be removably placed within the carriage after the tower has been erected and lifted vertically with the carriage to position the wind powered generator at a top of the tower; and wherein the wind powered generator can be removed from within the carriage after the carriage has been lowered; the tower comprising a lower tower section and an upper tower section;

the lower tower section including a first vertical column, a second vertical column and a third vertical column, the lower tower section further including at least three cross braces, with two of the cross braces being connected to each of the first vertical column, the second vertical column and the third vertical column; and the upper tower section including a first upper column, a second upper column and a third upper column, with the first upper column and the second upper column being substantially parallel and the third upper column converging towards the first upper column and the second upper column;

the lower tower section being configured to be connected to the upper tower section by connecting a top of the first vertical column of the lower tower section directly below the upper tower section to a bottom of the first upper column of the upper tower section, connecting a top of the second vertical column of the lower tower section directly below the upper tower section to a bottom of the second upper column of the upper tower section, and connecting a top of the third vertical column of the lower tower section directly below the upper tower section to a bottom of the third upper column of the upper tower section; and the track being fully assembled and ready to raise and lower the wind powered generator when the lower tower section is connected to the upper tower section.

61. The wind powered electrical generation system of claim 60, wherein:

the vertical track includes a first side guide having a first vertical strip and a second side guide having a second vertical strip; and the carriage includes a first side groove configured to accept the first vertical strip and a second side groove configured to accept the second vertical strip, thereby allowing the carriage to slide along the first vertical strip and the second vertical strip of the vertical track.

62. The wind powered electrical generation system of claim 61, wherein:

the first vertical strip is comprised of a plurality of first vertical strip portions;

the second vertical strip is comprised of a plurality of second vertical strip portions;

the first vertical column of the lower tower section includes one of the first vertical strips;

the first upper column includes one of the first vertical strips;

the second vertical column of the one lower tower section includes one of the second vertical strips;

the second upper column includes one of the second vertical strips; and the first vertical strip and the second vertical strip are fully assembled when the at least one lower tower section is connected to the upper tower section.

63. The wind powered electrical generation system of claim 62, further including:

a carriage raising assembly including a winch, a cable and a pulley; wherein the pulley is connected to the upper tower section and the winch is connected to the lower tower section;

and wherein the cable is connected to the winch and the carriage, the cable further being wrapped about the pulley whereby the carriage can be raised by rotating the winch to thereby pull the cable about the pulley and raise the carriage.

64. A wind powered generator comprising:

a housing;

a rod configured to rotate within the housing; at least six spars connected to the rod and extending radially therefrom;

an airfoil connected to each of the spars at a location distal the rod; and a generator located upwind of the spars and interconnected to the rod;

wherein the spars and the rod will rotate as wind passes the airfoils, thereby powering the generator;

the airfoils are configured to pivot about the spars and to slide longitudinally along the spars; the airfoils are biased towards a first end of the spars connected to the hub;

each spar includes a cam member adjacent a second end of the spar opposite to the hub;

each airfoil includes a cam surface configured to engage the cam member on the spar; and the cam member and the cam surface are configured to engage to thereby rotate the airfoils relative to the spars as the airfoils move along the spars towards the second end of the spars.

* * * * *

UNITED STATES PATENT AND TRADEMARK OFFICE
CERTIFICATE OF CORRECTION

PATENT NO.        : 7,218,013 B2
APPLICATION NO.   : 09/981231
DATED             : May 15, 2007
INVENTOR(S)       : Steve Anderson Platt It is certified that error appears in the above-identified patent and that said Letters Patent is hereby corrected as shown below:

Column 17, Claim 29, Line 61;
    "power" should be --powered--.

Signed and Sealed this

Fourth Day of September, 2007

JON W. DUDAS
*Director of the United States Patent and Trademark Office*